US012013658B2

(12) United States Patent
Sato et al.

(10) Patent No.: US 12,013,658 B2

(45) Date of Patent: Jun. 18, 2024

(54) IMAGE FORMING APPARATUS HAVING CARTRIDGE AND WASTE DEVELOPER ACCOMMODATING PORTION

(71) Applicant: Brother Kogyo Kabushiki Kaisha, Nagoya (JP)

(72) Inventors: Shougo Sato, Seto (JP); Hirotaka Mori, Nagoya (JP); Makoto Souda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/343,480

(22) Filed: Jun. 28, 2023

(65) Prior Publication Data

US 2023/0341808 A1 Oct. 26, 2023

Related U.S. Application Data

(60) Continuation of application No. 17/572,301, filed on Jan. 10, 2022, now Pat. No. 11,733,638, which is a (Continued)

(30) Foreign Application Priority Data

Dec. 26, 2011 (JP) ................................ 2011-284204
Feb. 29, 2012 (JP) ................................ 2012-044039

(51) Int. Cl.
*G03G 21/10* (2006.01)
*G03G 15/08* (2006.01)
(Continued)

(52) U.S. Cl.
CPC ......... *G03G 21/10* (2013.01); *G03G 15/0813* (2013.01); *G03G 15/0872* (2013.01);
(Continued)

(58) Field of Classification Search
CPC .................................................... G03G 21/185
See application file for complete search history.

(56) References Cited

U.S. PATENT DOCUMENTS 5,111,245 A 5/1992 DeCecca et al.
5,182,608 A 1/1993 Kroll et al.
(Continued)

FOREIGN PATENT DOCUMENTS

CN 101713956 A 5/2010
JP H04-104668 U 9/1992
(Continued)

OTHER PUBLICATIONS

Restriction Requirement issued in U.S. Appl. No. 13/626,175 dated Nov. 14, 2013.
(Continued)

*Primary Examiner* — Leon W Rhodes, Jr.
(74) *Attorney, Agent, or Firm* — Banner & Witcoff, Ltd.

(57) ABSTRACT

A photosensitive drum is rotatably supported in a main body. A developing cartridge is detachably mountable on the main body in a state where the photosensitive drum is supported in the main body. The developing cartridge includes a developing device and a frame. The developing device includes a developing roller disposed in confrontation with the photosensitive drum to supply developer to the photosensitive drum when the developing cartridge is mounted in the main body, and a developer-accommodating portion configured to accommodate developer. The frame includes a waste-developer-accommodating portion configured to accommodate waste developer and supports the developing device that is movable relative to the frame. The frame is disposed on an opposite side of the developing roller from the photosensitive drum. An urging member is disposed
(Continued)

between the frame and the developing device to urge the developing roller toward the photosensitive drum.

7 Claims, 8 Drawing Sheets

Related U.S. Application Data continuation of application No. 16/992,552, filed on Aug. 13, 2020, now Pat. No. 11,226,581, which is a continuation of application No. 16/594,157, filed on Oct. 7, 2019, now Pat. No. 10,747,164, which is a continuation of application No. 15/841,396, filed on Dec. 14, 2017, now Pat. No. 10,437,194, which is a continuation of application No. 15/042,619, filed on Feb. 12, 2016, now Pat. No. 9,846,406, which is a continuation of application No. 14/524,519, filed on Oct. 27, 2014, now Pat. No. 9,280,124, which is a division of application No. 13/626,175, filed on Sep. 25, 2012, now Pat. No. 8,873,999.

(51) Int. Cl.
*G03G 21/00* (2006.01)
*G03G 21/16* (2006.01)

(52) U.S. Cl.
CPC ....... *G03G 21/007* (2013.01); *G03G 21/1676* (2013.01); *G03G 21/169* (2013.01)

(56) References Cited

U.S. PATENT DOCUMENTS

| | | | |
|---|---|---|---|
| 5,398,098 | A | 3/1995 | Fukunaga et al. |
| 5,697,008 | A | 12/1997 | Katoh et al. |
| 5,781,841 | A | 7/1998 | Kouroku et al. |
| 6,330,410 | B1 | 12/2001 | Okabe et al. |
| 6,377,765 | B1 | 4/2002 | Shishido et al. |
| 6,728,500 | B2 | 4/2004 | Naito et al. |
| 7,068,965 | B2 | 6/2006 | Yoshino et al. |
| 7,136,608 | B2 | 11/2006 | Miller |
| 7,366,440 | B2 | 4/2008 | Horikawa |
| 7,463,847 | B2 | 12/2008 | Sato |
| 7,912,405 | B2 | 3/2011 | Nakanishi et al. |
| 8,019,254 | B2 | 9/2011 | Tatsumi et al. |
| 8,131,182 | B2 | 3/2012 | Mizuno et al. |
| 8,135,293 | B2 | 3/2012 | Yamaguchi et al. |
| 8,238,784 | B2 | 8/2012 | Kusudo et al. |
| 8,311,443 | B2 | 11/2012 | Sato et al. |
| 8,369,743 | B2 | 2/2013 | Maeshima et al. |
| 8,837,982 | B2 | 9/2014 | Matsuda |
| 9,122,240 | B2 | 9/2015 | Hashimoto |
| 9,323,174 | B2 | 4/2016 | Kato |
| 10,747,164 | B2 | 8/2020 | Sato et al. |
| 11,226,581 | B2 | 1/2022 | Sato et al. |
| 2009/0052940 | A1 | 2/2009 | Mizuno et al. |
| 2009/0317130 | A1 | 12/2009 | Ishikawa et al. |
| 2009/0324284 | A1 | 12/2009 | Ohta |
| 2010/0028041 | A1 | 2/2010 | Sakuma |
| 2010/0080579 | A1 | 4/2010 | Yamaguchi et al. |
| 2010/0209157 | A1 | 8/2010 | Sato et al. |
| 2012/0070186 | A1 | 3/2012 | Kikuchi et al. |
| 2012/0195627 | A1 | 8/2012 | Kikuchi |

FOREIGN PATENT DOCUMENTS

| | | | |
|---|---|---|---|
| JP | H06-222628 | A | 8/1994 |
| JP | H07-295461 | A | 11/1995 |
| JP | 2004246222 | A | 9/2004 |
| JP | 2009-048138 | A | 3/2009 |

OTHER PUBLICATIONS

Non-final Office Action issued in U.S. Appl. No. 13/626,175 dated Jan. 24, 2014.
Notice of Allowance issued in corresponding U.S. Appl. No. 13/626,175 dated Jun. 27, 2014.
CN Notification of First Office Action dated Jul. 17, 2014, CN Appln. 201210369705.1, English translation.
Apr. 20, 2015—U.S. Non-Final Office Action—U.S. Appl. No. 14/524,519.
Apr. 3, 2015—(CN) Notification of the Second Office Action—App 201210369705.1, Eng Tran.
Oct 7, 2015—U.S. Notice of Allowance—U.S. Appl. No. 14/524,519.
Jan. 19, 2016—(JP) Office Action—App 2012044039—Eng Tran.
Feb. 8, 2016—U.S.—Corrected Notice of Allowability—U.S. Appl. No. 14/524,519.
Aug. 16, 2017—U.S. Notice of Allowance—U.S. Appl. No. 15/042,619.
Jan. 2, 2019—U.S. Non-Final Office Action—U.S. Appl. No. 15/841,396.
Jun. 5, 2019—U.S. Notice of Allowance—U.S. Appl. No. 15/841,396.
Apr. 17, 2020—U.S. Notice of Allowance—U.S. Appl. No. 16/594,157.
Apr. 26, 2021—U.S. Non-final Office Action—U.S. Appl. No. 16/992,552.
Sep. 10, 2021—U.S. Notice of Allowance—U.S. Appl. No. 16/992,552.
Jan. 18, 2023—U.S.—Non-final Office Action—U.S. Appl. No. 17/572,301.
Mar. 30, 2023—U.S.—Notice of Allowance—U.S. Appl. No. 17/572,301.

16

16K

16Y,M,C

16K

16Y,M,C

IMAGE FORMING APPARATUS HAVING CARTRIDGE AND WASTE DEVELOPER ACCOMMODATING PORTION

CROSS REFERENCE TO RELATED APPLICATION

This application is a continuation application of U.S. application Ser. No. 17/572,301, filed Jan. 10, 2022, which is a continuation application of U.S. application Ser. No. 16/992,552, filed Aug. 13, 2020 (U.S. Pat. No. 11,226,581, issued Jan. 18, 2022), which is a continuation application of U.S. application Ser. No. 16/594,157, filed Oct. 7, 2019 (U.S. Pat. No. 10,747,164, issued Aug. 18, 2020), which is a continuation application of U.S. application Ser. No. 15/841,396, filed Dec. 14, 2017, (U.S. Pat. No. 10,437,194, issued Oct. 8, 2019), which is a continuation of U.S. application Ser. No. 15/042,619, filed Feb. 12, 2016, (U.S. Pat. No. 9,846,406, issued Dec. 19, 2017), which is a continuation of U.S. application Ser. No. 14/524,519, filed Oct. 27, 2014, (U.S. Pat. No. 9,280,124, issued Mar. 8, 2016), which is a division of U.S. application Ser. No. 13/626,175, filed Sep. 25, 2012 (U.S. Pat. No. 8,873,999, issued Oct. 28, 2014), which claims priority from Japanese Patent Applications No. 2011-284204 filed Dec. 26, 2011 and No. 2012-044039 filed Feb. 29, 2012. The entire contents of the priority applications are incorporated herein by reference.

TECHNICAL FIELD

The present invention relates to an image-forming apparatus employing an electrophotographic system.

BACKGROUND

An imaging cartridge including a process cartridge with a photosensitive member and a developing device, and a toner box unit mounted on the process cartridge is well known in the art, as is an image-forming apparatus provided with such imaging cartridges. In this type of image-forming apparatus, the toner box unit includes a new-toner box for accommodating unused toner to be supplied to the developing device and having a developing-side rotational shaft, and a waste-toner box for accommodating waste toner. The developing device is disposed adjacent to one side of the new-toner box, and a pressing mechanism disposed in the body of the image-forming device is provided on the other side of the new-toner box.

In the image-forming apparatus having the above structure, the pressing mechanism provided on the other side of the new-toner box presses the bottom portion of the new-toner box upward. This upward force causes the new-toner box to rotate about the developing-side rotational shaft, pushing the developing device toward the photosensitive member. In this way, a developing roller of the developing device is pushed toward the photosensitive member.

SUMMARY

However, since the upward force of the pressing mechanism is transferred to the developing roller through rotation of the new-toner box in the image-forming device described above, the developing roller cannot always be pressed reliably toward the photosensitive member. Thus, the developing roller and photosensitive member cannot be positioned with sufficient precision.

Therefore, it is a first object of the present invention to provide an image-forming apparatus capable of improving the precision at which the developing roller and photosensitive member are positioned relative to one another, while maintaining a compact waste-developer accommodating section.

Another image-forming apparatus known in the art that is different from the image-forming device described above comprises a main body, photosensitive members rotatably supported in the main body, and an imaging unit mounted in the main body so as to be capable of being pulled along the axial direction of the photosensitive members. The imaging unit further includes cleaning devices that remove waste toner from the surfaces of photosensitive members and collect the waste toner. Waste toner accommodating devices for accommodating waste toner collected by the cleaning devices, developing devices that accommodate unused toner, and handles coupled to the downstream ends of the cleaning devices and developing devices with respect to the direction that the imaging unit is pulled and that each have an internally built-in toner conveying device for conveying waste toner from the respective cleaning device to the respective waste toner accommodating device.

In the image-forming apparatus described above, each imaging unit (cleaning device, waste-toner accommodating device, developing device, and handle) is replaced while the photosensitive drums remain supported in the main body by pulling the imaging unit out of the main body along the axial direction of the photosensitive members.

However, in the above configuration, the cleaning devices are normally in contact with respective photosensitive members for removing and collecting waste toner from the surfaces of the photosensitive members. Hence, when a cleaning device is moved relative to the photosensitive member, toner can drop off the cleaning device, photosensitive member, or the region of contact between the two members.

That is the cleaning device and other members of the imaging unit in the image-forming apparatus described above are pulled out of the main body while the photosensitive members are supported in the main body. Accordingly, toner can sometimes fall off the photosensitive members and cleaning devices, contaminating the inside and outside of the main body.

Therefore, it is a second object of the present invention to provide an image-forming apparatus capable of minimizing the amount of developer that contaminates the inside and outside of the main body, while allowing for a compact device.

The first object described above will be attained by an image-forming apparatus including a main body, a photosensitive drum, a developing cartridge, and an urging member. The photosensitive drum is rotatably supported in the main body. The developing cartridge is detachably mountable on the main body in a state where the photosensitive drum is supported in the main body. The developing cartridge includes a developing device and a frame. The developing device includes a developing roller disposed in confrontation with the photosensitive drum to supply developer to the photosensitive drum when the developing cartridge is mounted in the main body, and a developer-accommodating portion configured to accommodate developer. The frame includes a waste-developer-accommodating portion configured to accommodate waste developer and supports the developing device that is movable relative to the frame. The frame is disposed on an opposite side of the developing roller from the photosensitive drum. The urging member is disposed between the frame and the developing device to urge the developing roller toward the photosensitive drum.

The second object described above will be attained by an image-forming apparatus including a main body, a drum unit, a developing cartridge, and a first conveying member. The drum unit is provided in the main body. The drum unit includes a photosensitive drum configured to support developer and to rotate about an axis extending an axial direction, and a drum cleaning unit configured to remove waste developer from a surface of the photosensitive drum to collect the waste developer. The developing cartridge is configured to supply developer to the photosensitive drum and includes a waste-developer-accommodating portion configured to accommodate the waste developer. The developing cartridge is configured to be moved between a mounted position where the developing cartridge is mounted on the main body and a separated position where the developing cartridge is separated from the main body by being pulled out in the axial direction while the drum unit is accommodated in the main body. The developing cartridge is spaced apart from the drum cleaning unit in a circumferential direction of the photosensitive drum. The waste-developer-accommodating portion has an upstream end portion and a downstream end portion in a pulled direction that the developing cartridge is pulled from the mounted position to the separated position. The drum cleaning unit has an upstream end portion and a downstream end portion in the pulled direction. The first conveying member is configured to convey the waste developer from the drum cleaning unit to the waste-developer-accommodating portion. The first conveying member has one end portion and another end portion. The one end portion of the first conveying member is connected to the downstream end portion of the waste-developer-accommodating portion such that the developing cartridge and the first conveying member are integrally moved. The other end portion of the first conveying member is connected to the downstream end portion of the drum cleaning unit if the developing cartridge is in the mounted position, and the other end portion of the first conveying member is disconnected from the downstream end portion of the drum cleaning unit if the developing cartridge is in the separated position.

DETAILED DESCRIPTION

1. Overall Structure of a Color Printer

Figure 1:
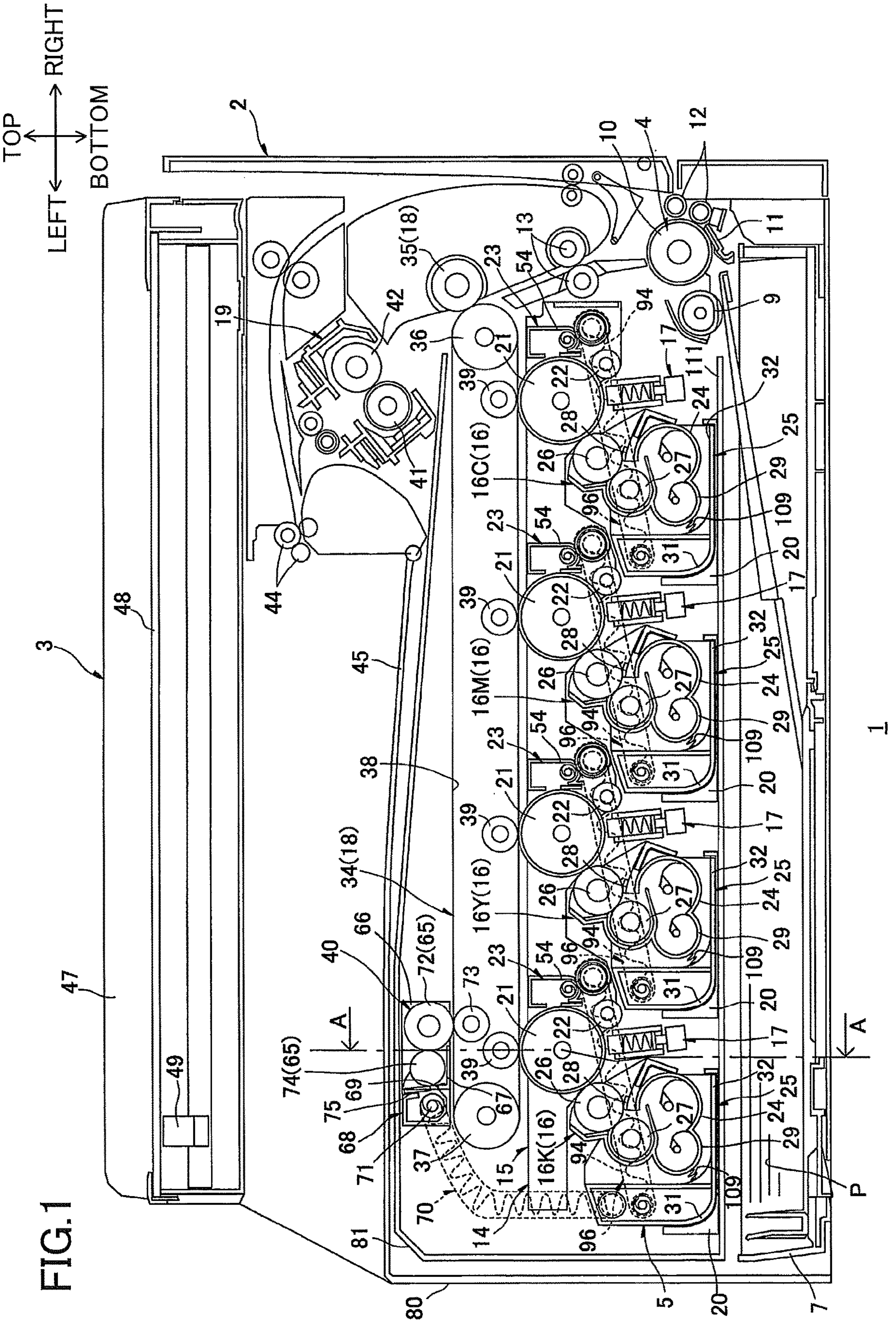
FIG. 1 is a cross-sectional view of a color printer serving as a preferred embodiment of the image-forming device according to the present invention.

FIG. 1 shows a color printer 1 serving as an example of the image-forming apparatus of the present invention. The color printer 1 is a horizontal tandem-type intermediate transfer color printer.

The color printer 1 is a multifunction peripheral that is integrally provided with a main casing 2 constituting the main body, and a flatbed scanner 3 provided above the main casing 2 for scanning image data of an original.

Within the main casing 2, the color printer 1 also includes a sheet-feeding unit 4 for feeding sheets of a paper P to be printed, and an image-forming unit 5 for forming images on the paper P supplied by the flatbed scanner 3.

(1) Main Casing

Figure 2:
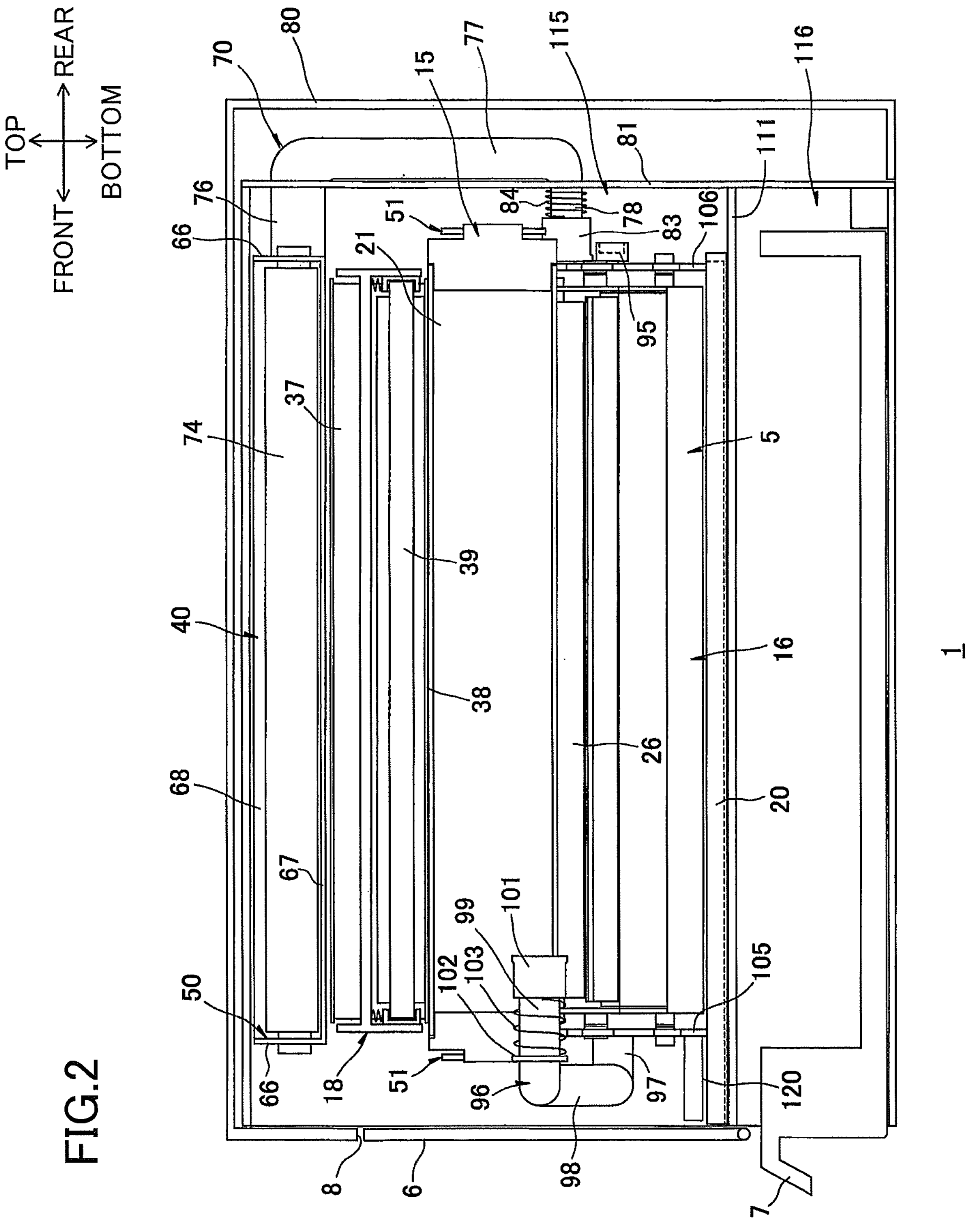
FIG. 2 is a cross-sectional view of the color printer in FIG. 1 taken along the plane A-A.

As shown in FIGS. 1 and 2, the main casing 2 is formed in a box-like shape and serves to accommodate the sheet-feeding unit 4 and image-forming unit 5. An access opening 8 is formed in one side wall of the main casing 2. A front cover 6 is provided on the main casing 2 over the access opening 8. The front cover 6 can be pivoted (moved) about its bottom edge between a closed position (see FIG. 2) covering the access opening 8, and an open position (see FIG. 6) exposing the access opening 8.

In the following description, the side of the main casing 2 on which the front cover 6 is provided (the left side in FIG. 2) will be referred to as the "front side," and the opposite side (the right side in FIG. 2) as the "rear side." Further, left and right sides of the main casing 2 in the following description will be based on the perspective of a user facing the front side of the color printer 1. Thus, the left side of the main casing 2 in FIG. 1 will be considered the "left side" and the right side in FIG. 1 the "right side," while the near side in FIG. 1 will be considered the "front side" and the far side in FIG. 1 the "rear side."

(2) Sheet-Feeding Unit

The sheet-feeding unit 4 includes a paper tray 7 that accommodates sheets of the paper P. The paper tray 7 is detachably mounted in the bottom section of the main casing 2.

The sheet-feeding unit 4 also includes a pick-up roller 9 disposed above the right end of the paper tray 7, a feeding roller 10 disposed to the right of the pick-up roller 9, a feeding pad 11 disposed so as to confront the feeding roller 10 from the bottom thereof, a pair of pinch rollers 12 disposed in contact with the right side of the feeding roller 10, and a pair of registration rollers 13 disposed above the feeding roller 10 so as to confront each other in the left-right direction. The pick-up roller 9 rotates to supply sheets of paper P accommodated in the paper tray 7 between the feeding roller 10 and feeding pad 11, whereby the rotation of the feeding roller 10 separates and feeds the paper P one sheet at a time. The rotating feeding roller 10 subsequently supplies each sheet of paper P so as to pass sequentially between the feeding roller 10 and the pinch rollers 12 and to enter between the registration rollers 13 disposed above the feeding roller 10. The registration rollers 13 rotate in order to supply the sheets to the image-forming unit 5 (between an intermediate transfer belt 38 and a secondary transfer roller 35, both described later) at a prescribed timing.

(3) Image-Forming Unit

The image-forming unit 5 is disposed above the sheet-feeding unit 4 and includes a process unit 14, a transfer unit 18, and a fixing unit 19.

(3-1) Process Unit

The process unit 14 is disposed above the paper tray 7. The process unit 14 includes a drum unit 15, four developing cartridges 16, and four LED units 17.

(3-1-1) Drum Unit

The drum unit 15 is disposed in the top portion of the process unit 14. The drum unit 15 integrally retains four each of photosensitive drums 21, charging rollers 22, and drum cleaners 23.

Figure 5A:
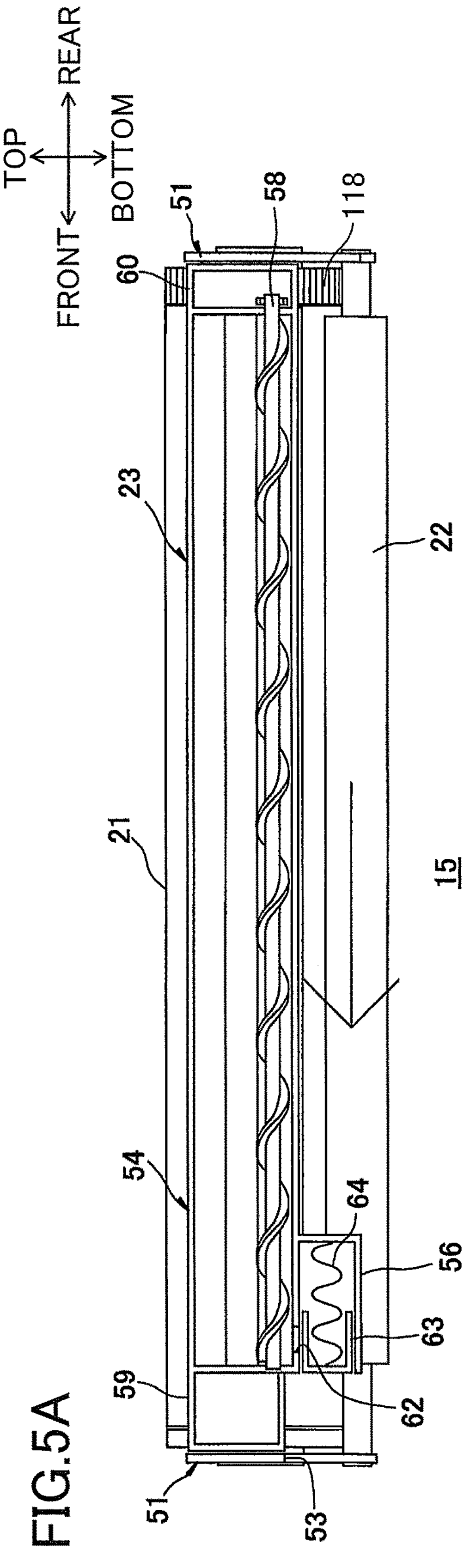
FIG. 5A is a cross-sectional view of the drum unit taken along the plane B-B in FIG. 4(*a*) when a drum-unit-side shutter is disposed in a closed position.

The four photosensitive drums 21 correspond to the four printing colors (black, yellow, magenta, and cyan) and are arranged parallel to one another and spaced at intervals in the left-right direction. As shown in FIG. 5A, each photosensitive drum 21 is provided with a drum gear 118 on its left end thereof to receive a drive force from a motor (not shown).

Four corresponding charging rollers 22 are provided for the four photosensitive drums 21. Each charging roller 22 is disposed on the lower right side of the corresponding photosensitive drum 21 so as to confront and contact the same.

Four corresponding drum cleaners 23 are provided for the four photosensitive drums 21. Each drum cleaner 23 is disposed on the right side of the corresponding photosensitive drum 21.

(3-1-2) Developing Cartridges

Four corresponding developing cartridges 16 are provided for the four photosensitive drums 21. The developing cartridges 16 can be inserted into and pulled out of the main casing 2 in the front and rear directions. Each of the developing cartridges 16 is disposed below a corresponding photosensitive drum 21. Hence, the developing cartridges 16 are arranged parallel to each other and spaced apart in the left-right direction. More specifically, the developing cartridges 16 include a black developing cartridge 16K, a yellow developing cartridge 16Y, a magenta developing cartridge 16M, and a cyan developing cartridge 16C arranged from left-to-right in the sequence given.

As will be described below, each of the developing cartridges 16 includes a developing device 24, and a cartridge frame 25 serving as an outer frame. The developing device 24 is accommodated in the corresponding cartridge frame 25 and includes a developing roller 26.

The developing roller 26 is rotatably supported in the upper portion of the developing device 24. The developing roller 26 is exposed in the upper right side of the developing device 24 and contacts the lower left side of the photosensitive drum 21.

The developing device 24 includes a supply roller 27 for supplying toner to the developing roller 26, and a thickness-regulating blade 28 for regulating the thickness of toner carried on the developing roller 26. The developing device 24 also includes a toner-accommodating section 29 disposed below the supply roller 27 for accommodating toner in the corresponding color (black, yellow, magenta, or cyan).

(3-1-3) LED Units

The LED units 17 are supported in the main casing 2 in positions for confronting the corresponding photosensitive drums 21 from below. Each LED unit 17 exposes the surface of the corresponding photosensitive drum 21 based on prescribed image data.

(3-2) Transfer Unit

The transfer unit 18 is positioned above the process unit 14 and includes a belt unit 34, and a secondary transfer roller 35.

The belt unit 34 is oriented in the left-right direction so as to confront each of the photosensitive drums 21 from above. The belt unit 34 includes a drive roller 36, a follow roller 37, an endless intermediate transfer belt 38, four primary transfer rollers 39, and a belt cleaner 40. The drive roller 36 and follow roller 37 are arranged parallel to each other and are separated in the left-right direction.

The intermediate transfer belt 38 is looped around the drive roller 36 and follow roller 37, with the lower portion of the intermediate transfer belt 38 disposed above the photosensitive drums 21 so as to oppose and contact the same. When the drive roller 36 is driven to rotate, the follow roller 37 follows as the intermediate transfer belt 38 circulates so that its lower portion in contact with the photosensitive drums 21 moves rightward.

Each of the primary transfer rollers 39 is disposed in confrontation with the corresponding photosensitive drums 21, with the lower portion of the intermediate transfer belt 38 interposed therebetween.

The belt cleaner 40 is disposed above the left end of the intermediate transfer belt 38. As will be described later in greater detail, the belt cleaner 40 includes a belt cleaning roller 72, and a counter roller 73. The belt cleaning roller 72 is disposed above the intermediate transfer belt 38 so as to vertically confront the counter roller 73 with the intermediate transfer belt 38 interposed therebetween.

The secondary transfer roller 35 is provided on the right side of the belt unit 34 and confronts the drive roller 36 with the intermediate transfer belt 38 interposed therebetween.

(3-3) Fixing Unit

The fixing unit 19 is disposed diagonally above and leftward of the secondary transfer roller 35. The fixing unit 19 includes a heating roller 41, and a pressure roller 42 that contacts the upper right side of the heating roller 41 and applies pressure thereto.

(3-4) Image-Forming Operation (3-4-1) Developing Operation

Toner in each developing device 24 is supplied onto the corresponding supply roller 27, and the supply roller 27 in turn supplies the toner onto the developing roller 26. The thickness-regulating blade 28 regulates the thickness of toner supplied to the developing roller 26 as the developing roller 26 rotates, maintaining the toner carried on the surface of the developing roller 26 at a uniform thickness.

In the meantime, the charging roller 22 applies a uniform positive charge to the surface of the photosensitive drum 21 as the photosensitive drum 21 rotates. Subsequently, the photosensitive drum 21 is exposed by the LED unit 17, forming an electrostatic latent image on the surface of the photosensitive drum 21 corresponding to an image to be printed on the paper P.

As the photosensitive drum 21 continues to rotate, the positively charged toner carried on the surface of the developing roller 26 is supplied to the latent image formed on the surface of the photosensitive drum 21. The toner develops the latent image on the photosensitive drum 21 into a visible toner image through reverse development.

(3-4-2) Transferring and Fixing Operations

A primary transfer is performed by sequentially transferring toner images carried on the surfaces of the photosensitive drums 21 onto the lower portion of the intermediate transfer belt 38 as the lower portion moves from left to right. The primary transfers form a color image on the intermediate transfer belt 38. As the intermediate transfer belt 38 passes through a position opposing the secondary transfer roller 35, the color image formed on the intermediate transfer belt 38 is transferred in a secondary transfer onto a sheet of paper P supplied from the sheet-feeding unit 4. Next, the color image transferred onto the paper P is fixed to the paper P by heat and pressure as the paper P passes between the heating roller 41 and pressure roller 42 in the fixing unit 19.

(4) Paper Discharge

Discharge rollers 44 disposed downstream of the fixing unit 19 receive the paper P after the toner image has been fixed in the fixing unit 19 and discharge the sheet onto a discharge tray 45 formed on the top surface of the main casing 2.

(5) Flatbed Scanner

The flatbed scanner 3 is disposed above the discharge tray 45. The flatbed scanner 3 includes a cover 47, a glass surface 48, and a CCD sensor 49. After an original is placed between the cover 47 and the glass surface 48, the flatbed scanner 3 scans image data from the original by sliding the CCD sensor 49 over the same.

Subsequently, the image-forming unit 5 can form an image on a sheet of paper P as described above based on the image data scanned from the original.

2. Detailed Description of the Main Casing

As shown in FIG. 2, the main casing 2 includes an outer casing 80 constituting the outer shape of the color printer 1, and an inner casing 81 provided on the inside of the outer casing 80.

The outer casing 80 is generally box-shaped and substantially rectangular in a side view. The front cover 6 is provided on the front side of the outer casing 80.

The inner casing 81 is generally box-shaped and substantially rectangular in a side view. The inner casing 81 has vertical and left-right dimensions sufficient for accommodating the sheet-feeding unit 4 (see FIG. 1) and the image-forming unit 5. The inner casing 81 is shifted forward in the outer casing 80 so that a gap is formed between the rear sides of the outer casing 80 and inner casing 81.

A partitioning wall 111 partitions the inner space of the inner casing 81. The partitioning wall 111 has a generally flat plate shape and is disposed between the paper tray 7 and developing cartridge 16 with respect to the vertical direction. The partitioning wall 111 partitions the inner space of the inner casing 81 into a cartridge-accommodating space 115 above the partitioning wall 111, and a paper-tray-accommodating space 116 below the partitioning wall 111.

Figure 3:
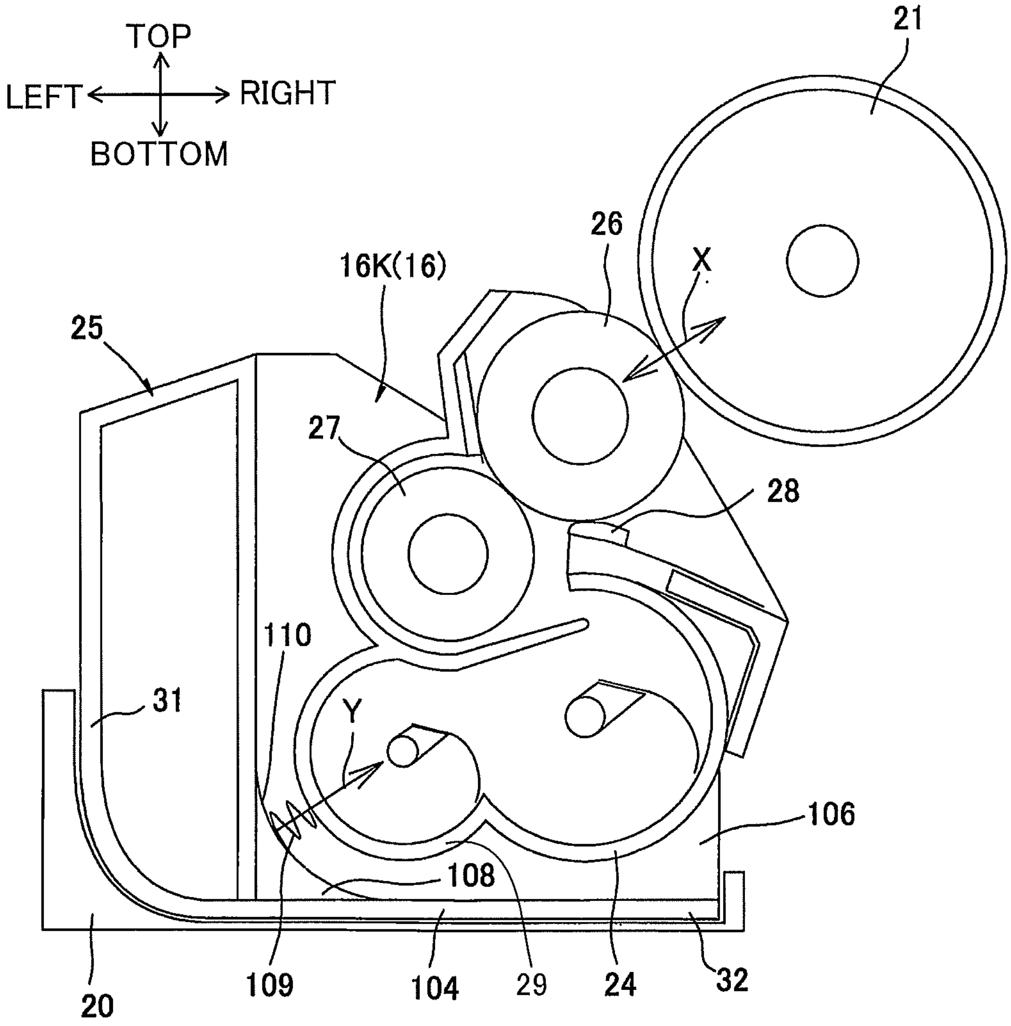
FIG. 3 is a cross-sectional view of a developing cartridge and photosensitive drum shown in FIG. 1.

Retaining members 20 are provided on the top surface of the partitioning wall 111. As shown in FIGS. 1 and 2, the four retaining members 20 are provided to correspond to the four developing cartridges 16. As shown in FIGS. 2 and 3, each retaining member 20 has a tray-like structure elongated in the front-rear direction and substantially U-shaped in a front view. The retaining member 20 is open on the top, front, and rear sides. The inner surface of the retaining member 20 is shaped to conform to the outer surface on the bottom portion of the corresponding cartridge frame 25 (described later). The inner dimensions (left-right and front-rear dimensions) of the retaining member 20 are approximately the same as the outer dimensions of the cartridge frame 25.

More specifically, the left wall of the retaining member 20 has a greater vertical dimension than the right wall, as illustrated in FIGS. 1 and 3. Further, the inside surface of the retaining member 20 in the area where the left wall connects to the bottom wall has an arc shape in a front view that conforms to the bottom portion of a second accommodating section 31 (described later).

3. Detailed Description of the Drum Unit (1) Drum Frames

As shown in FIG. 2, the drum unit 15 includes a pair of drum frames 51 arranged parallel to each other and spaced apart in the front-rear direction.

Figure 4A:
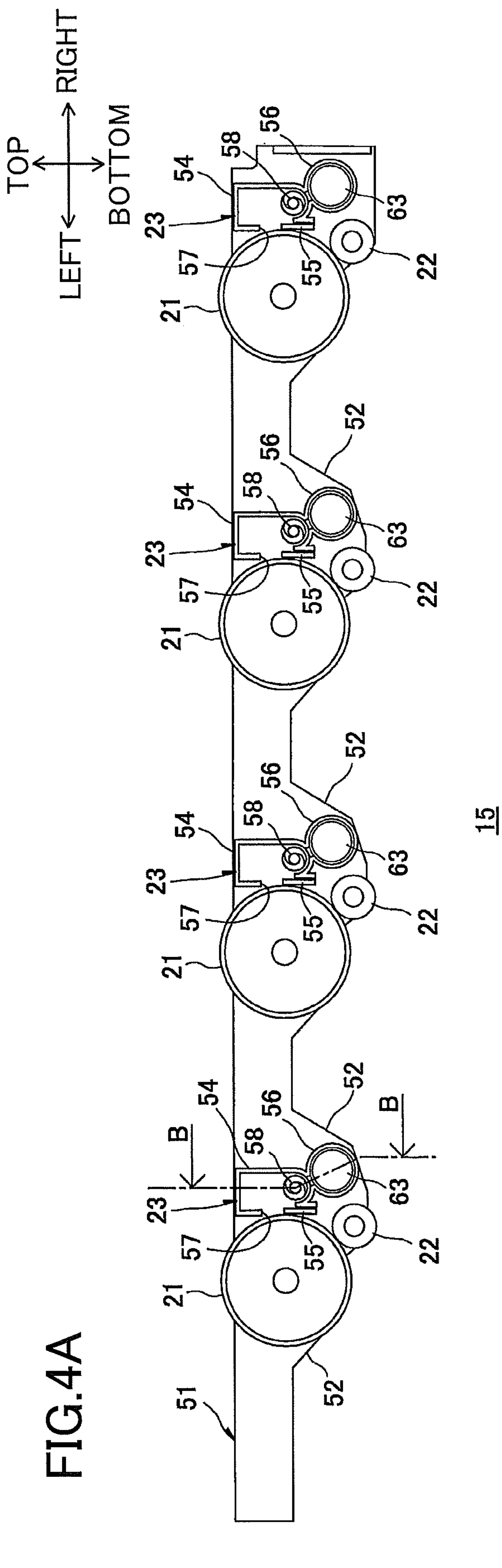
FIG. 4A is a cross-sectional view of a drum unit shown in FIG. 1.
Figure 4B:
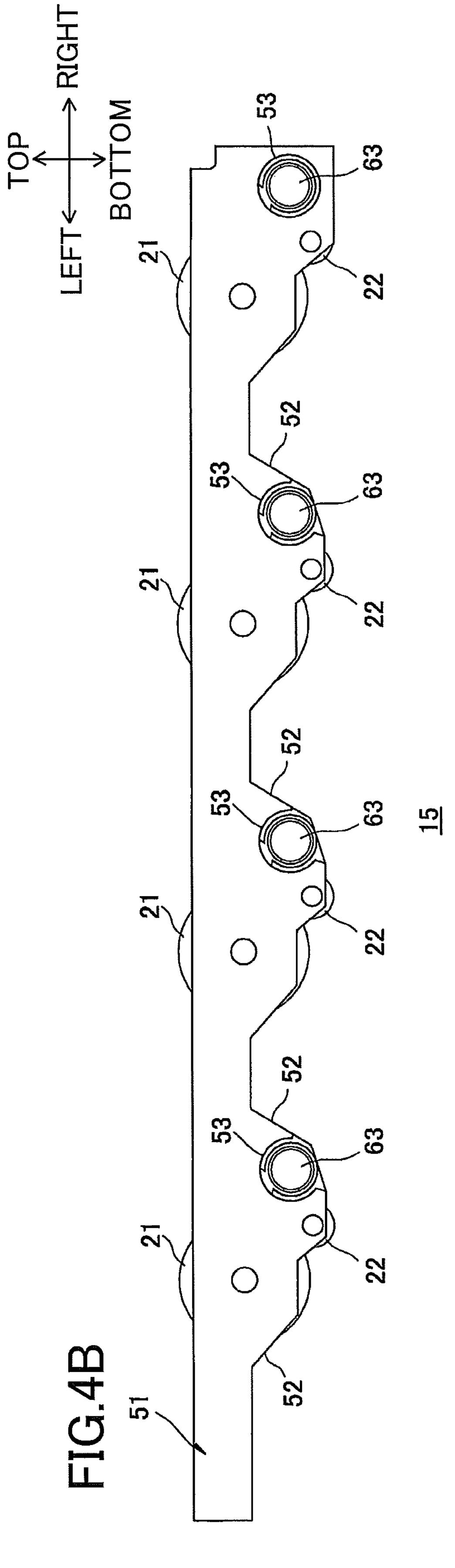
FIG. 4B is a front view of the drum unit.

As shown in FIGS. 4A and 4B, the drum frames 51 have a generally flat plate shape that is elongated in the left-right direction. Cartridge grooves 52 are formed in the bottom edges of the drum frames 51. The cartridge grooves 52 are notches formed in portions of the drum frames 51 that overlap the top ends of the developing devices 24 in the corresponding developing cartridges 16 when projected in the front-rear direction (see FIG. 1). More specifically, the edge defining the cartridge groove 52 corresponding to the black developing cartridge 16K first extends rightward from the left edge of the drum frame 51, then gradually slopes downward toward the right. The cartridge grooves 52 corresponding to the other developing cartridges 16 for yellow, magenta, and cyan (the yellow developing cartridge 16Y, magenta developing cartridge 16M, and cyan developing cartridge 16C) are substantially U-shaped notches cutout upward into the bottom edge of the drum frame 51 so as to be open on the bottom.

As shown in FIG. 4B, four insertion holes 53 are formed in the drum frame 51 positioned on the front side. The insertion holes 53 are spaced at intervals in the left-right direction in positions corresponding to first receiving cylinders 56 (described later). The insertion holes 53 are formed in regions overlapping the first receiving cylinders 56 when projected in the front-rear direction. The insertion holes 53 are generally circular in a front side view and penetrate the front drum frame 51 in the front-rear direction. The insertion holes 53 have a slightly larger diameter than the outer diameter of pipe-side shutters 101 (described later).

The photosensitive drums 21, charging rollers 22, and drum cleaners 23 are supported between the pair of drum frames 51. As shown in FIG. 5A, the photosensitive drums 21 are generally cylindrical in shape and are elongated in the front-rear direction. The front and rear ends of each photosensitive drum 21 are rotatably supported in the corresponding drum frames 51.

The charging rollers 22 are generally cylindrical in shape and elongated in the front-rear direction. The front and rear ends of each charging roller 22 are rotatably supported in the corresponding drum frames 51.

(2) Drum Cleaners

As shown in FIG. 4A, each drum cleaner 23 includes a drum collection unit 54, and a drum scraping blade 55.

As shown in FIG. 5A, the drum collection unit 54 is generally box-shaped and elongated in the front-rear direction. As shown in FIG. 4A, the drum collection unit 54 is generally rectangular in a front view, with a longer vertical dimension than left-right dimension. The bottom wall of the drum collection unit 54 has a generally semicircular arc shape in a front view, with the convex side of the arc facing downward. The bottom wall of the drum collection unit 54 follows the rotating path of a first auger screw 58 (described later). The drum collection unit 54 also includes an opening 57 formed in its left wall (see FIG. 4A), and a first toner outlet 62 formed in its bottom wall (see FIG. 5A).

As shown in FIG. 4A, the opening 57 is formed in the left wall of the drum collection unit 54 and penetrates the wall in the left-right direction.

As shown in FIG. 5A, the first toner outlet 62 is formed in the bottom wall of the drum collection unit 54 near the front end thereof, penetrating the bottom wall vertically. The first toner outlet 62 is in communication with the drum collection unit 54 and the first receiving cylinder 56 (described later).

The first auger screw 58 is provided in each drum collection unit 54. The first auger screw 58 is elongated in the front-rear direction and is disposed along the bottom wall of the drum collection unit 54 (see FIG. 4A). The front end of the first auger screw 58 is rotatably supported in the front wall of the drum collection unit 54, while the rear end is rotatably supported in the rear wall of the drum collection unit 54.

A front fixing part 59, a rear fixing part 60, and the first receiving cylinder 56 as an engaged portion are integrally provided with the drum collection unit 54.

The front fixing part 59 has a general box shape and is substantially rectangular in a front view. The front fixing part 59 is provided on the front wall of the drum collection unit 54. The front fixing part 59 has a smaller vertical dimension than that of the drum collection unit 54.

The rear fixing part 60 is also generally box-shaped and substantially rectangular in a front view. The rear fixing part 60 is provided on the rear wall of the drum collection unit 54 and has a vertical dimension approximately equivalent to that of the drum collection unit 54.

The first receiving cylinder 56 has a generally cylindrical shape and is elongated in the front-rear direction. The rear end of the first receiving cylinder 56 is closed, while an upper portion of the first receiving cylinder 56 is continuous with the bottom wall of the drum collection unit 54 on the front end thereof. The inner diameter of the first receiving cylinder 56 is approximately equivalent to the outer diameter of a second insertion part 99 (described later).

A drum-unit-side shutter 63 is provided in the drum-unit-side receiving cylinder 56. The drum-unit-side shutter 63 is generally cylindrical in shape and closed on the front end. The drum-unit-side shutter 63 is accommodated inside the first receiving cylinder 56. The outer diameter of the drum-unit-side shutter 63 is substantially equivalent to the inner diameter of the first receiving cylinder 56. The drum-unit-side shutter 63 is slidably disposed in the first receiving cylinder 56 and can be moved between an open position (see FIG. 5B) at the rear end part of the first receiving cylinder 56 for exposing the first toner outlet 62, and a closed position (see FIG. 5A) at the front end of the first receiving cylinder 56 for closing the first toner outlet 62.

A compression spring 64 is interposed between the rear wall of the first receiving cylinder 56 and the front wall of the drum-unit-side shutter 63. The compression spring 64 constantly urges the drum-unit-side shutter 63 forward toward the closed position.

As shown in FIG. 4A, the drum scraping blade 55 has a generally flat plate shape and is elongated vertically. The bottom end (proximal part) is fixed to the left side of the left wall constituting the drum collection unit 54 at a peripheral portion of the opening 57 so that the top end (distal part) contacts the photosensitive drum 21 from the right side.

As shown in FIG. 5A, the drum cleaner 23 is held in the drum frames 51 by fixing the front end of the front fixing part 59 to the front drum frame 51 and the rear end of the rear fixing part 60 to the rear drum frame 51.

4. Detailed Description of the Belt Unit (1) Belt Cleaner

As shown in FIG. 2, the belt cleaner 40 includes a belt cleaner frame 50. The belt cleaner frame 50 has a square U-shape in a side view and is open on the top. More specifically, the belt cleaner frame 50 includes a pair of side walls 66 disposed in opposition to each other across a gap in the front-rear direction, and a cover wall 67 bridging the lower ends of the side walls 66.

As shown in FIG. 1, the side walls 66 have a generally flat plate shape and are elongated in the left-right direction. A belt recovery unit 65, and a belt collection unit 68 are retained between the side walls 66.

The belt recovery unit 65 further includes a belt cleaning roller 72, and a relay roller 74.

The belt cleaning roller 72 is generally cylindrical in shape and elongated in the front-rear direction. The front and rear ends of the belt cleaning roller 72 are rotatably supported in the corresponding side walls 66. The cover wall 67 has a cutout portion for exposing the bottom portion of the belt cleaning roller 72. The belt cleaning roller 72 is disposed so as to vertically confront the counter roller 73, with the intermediate transfer belt 38 interposed therebetween.

The relay roller 74 is disposed on the left side of the belt cleaning roller 72 and contacts the belt cleaning roller 72 from the left side. As shown in FIG. 2, the relay roller 74 is generally cylindrical in shape and elongated in the front-rear direction. The front and rear ends of the relay roller 74 are rotatably supported in the corresponding side walls 66.

The belt collection unit 68 is elongated in the front-rear direction. The belt collection unit 68 has a general box shape, with its front and rear ends closed by the pair of side walls 66 (see FIG. 1).

As shown in FIG. 1, an opening 69 is formed in the right wall of the belt collection unit 68, penetrating the lower portion of the right wall in the left-right direction.

Figure 6:
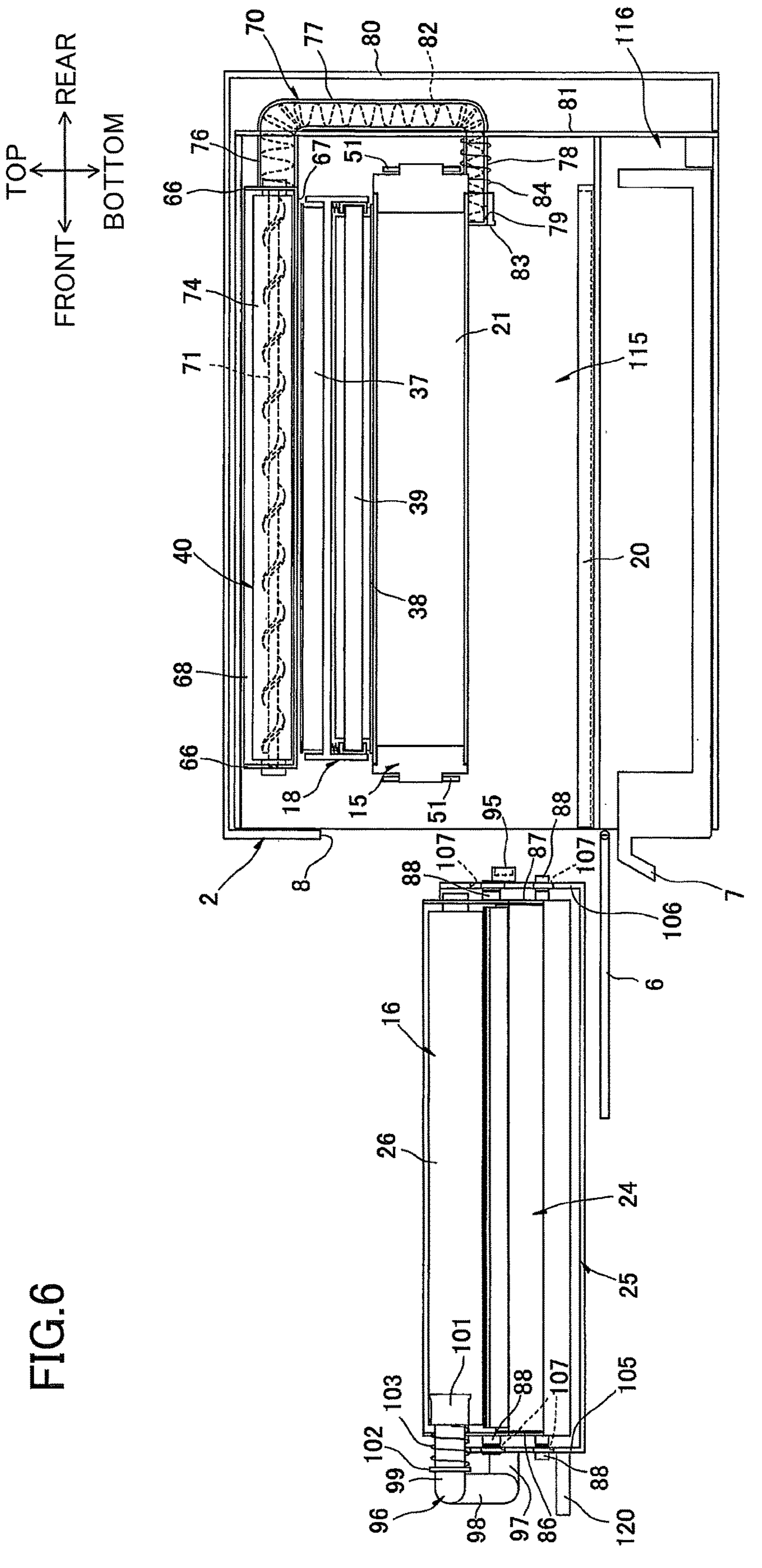
FIG. 6 is a right side view of the color printer when the developing cartridges shown in FIG. 1 have been pulled out of a main casing.

A second auger screw 71 is provided in the belt collection unit 68. As shown in FIG. 6, the second auger screw 71 is elongated in the front-rear direction. The front end of the second auger screw 71 is rotatably supported in the front side wall 66, while the rear end is rotatably supported in the rear side wall 66.

As shown in FIG. 1, a scraping blade 75 is provided on the belt collection unit 68. The scraping blade 75 has a generally flat plate shape and is elongated vertically. The top end (proximal part) is fixed to the right wall of the belt collection unit 68 on a peripheral portion of the opening 69 so that the bottom end (distal part) contacts the relay roller 74 from the left side.

A first conveying pipe 70 is coupled to the belt collection unit 68. As shown in FIG. 6, the first conveying pipe 70 has a pipe-like structure. A coil-spring-like screw 82 is accommodated inside the first conveying pipe 70. The first conveying pipe 70 has an angular U-shape in a side view, with its upper and lower ends bent forward. Specifically, the first conveying pipe 70 is integrally configured of a first coupling part 76, a middle part 77, and a first insertion part 78.

The first coupling part 76 constitutes the top end of the first conveying pipe 70. The first coupling part 76 extends in the front-rear direction, with its front end fixed to the rear side wall 66 so as to share its central axis with the second auger screw 71 and to be in communication with the interior of the belt collection unit 68, while the rear end extends rearward, penetrating the rear wall of the inner casing 81.

The middle part 77 bends downward from the rear end of the first coupling part 76 and extends straight down therefrom. Specifically, as shown in FIG. 1, the middle part 77 first slopes downward to the left from the rear end of the first coupling part 76, then bends and extends vertically downward. As shown in FIG. 6, the middle part 77 is positioned between the rear wall of the outer casing 80 and the rear wall of the inner casing 81.

The first insertion part 78 constitutes the lower end of the first conveying pipe 70. The first insertion part 78 bends forward from the bottom end of the middle part 77 and extends forward so as to penetrate the rear wall of the inner casing 81.

A second toner outlet 79 is formed in the first insertion part 78. The second toner outlet 79 vertically penetrates a lower portion of the first insertion part 78 near the front end thereof.

The first insertion part 78 includes a conveying-pipe-side shutter 83. The conveying-pipe-side shutter 83 has a generally cylindrical shape and is elongated in the front-rear direction. The conveying-pipe-side shutter 83 fits around the outside of the first insertion part 78. The inner diameter of the conveying-pipe-side shutter 83 is substantially equivalent to (slightly larger than) the outer diameter of the first insertion part 78. The conveying-pipe-side shutter 83 is slidably disposed between an open position (see FIG. 2) on the rear end of the first insertion part 78 for exposing the second toner outlet 79, and a closed position (see FIG. 6) on the front end of the first insertion part 78 for closing the second toner outlet 79. Hence, the conveying-pipe-side shutter 83 functions to open and close the second toner outlet 79.

A compression spring 84 is interposed between the rear end of the conveying-pipe-side shutter 83 and the rear wall of the inner casing 81. The compression spring 84 constantly urges the conveying-pipe-side shutter 83 forward toward the closed position.

5. Detailed Description of the Developing Cartridges

(1) Cartridge Frame

As shown in FIG. 1, the cartridge frames 25 are generally rectangular in a front side view. Each cartridge frame 25 is partitioned into a first accommodating section 32 constituting the right portion, and the second accommodating section 31 constituting the left portion.

(1-1) First Accommodating Section

Figure 7A:
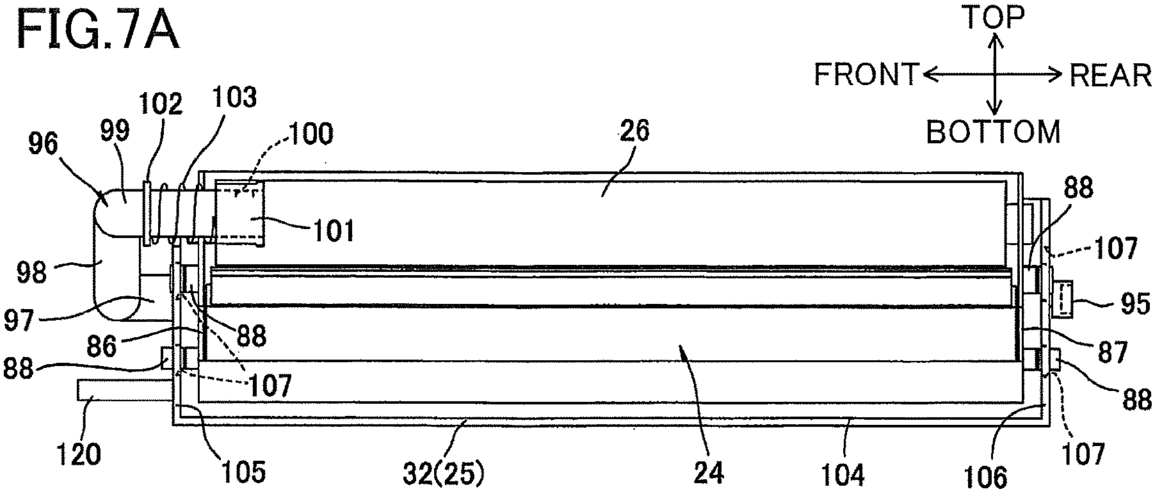
FIG. 7A is a right side view of the black developing cartridge shown in FIG. 1.
Figure 7B:
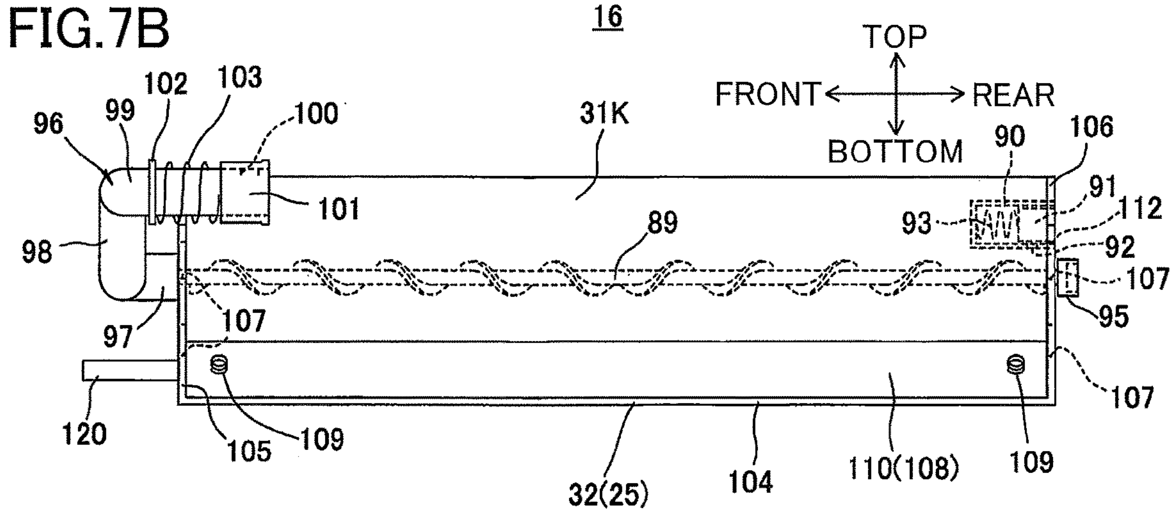
FIG. 7B is a right side view of the black developing cartridge when the developing device has been removed.

As shown in FIG. 7A, the first accommodating section 32 is formed with sufficient length in the front-to-rear direction to accommodate the developing device 24. As shown in FIG. 7B, the first accommodating section 32 has an angular U-shape that opens upward. Specifically, the first accommodating section 32 includes a front wall 105 and a rear wall 106 disposed in opposition to each other across a gap in the front-rear direction, and a bottom wall 104 bridging the bottom ends of the front wall 105 and rear wall 106.

Figure 8A:
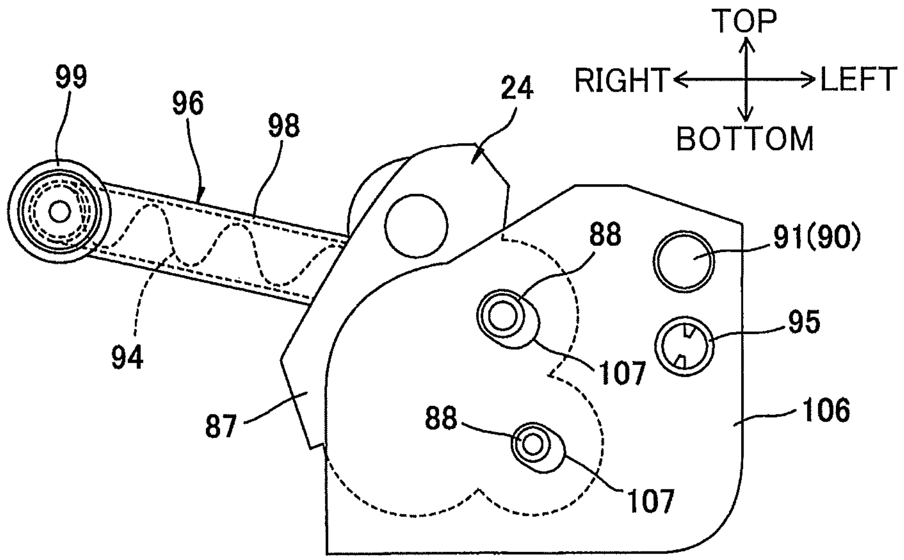
FIG. 8A is a rear side view of the black developing cartridge.
Figure 8B:
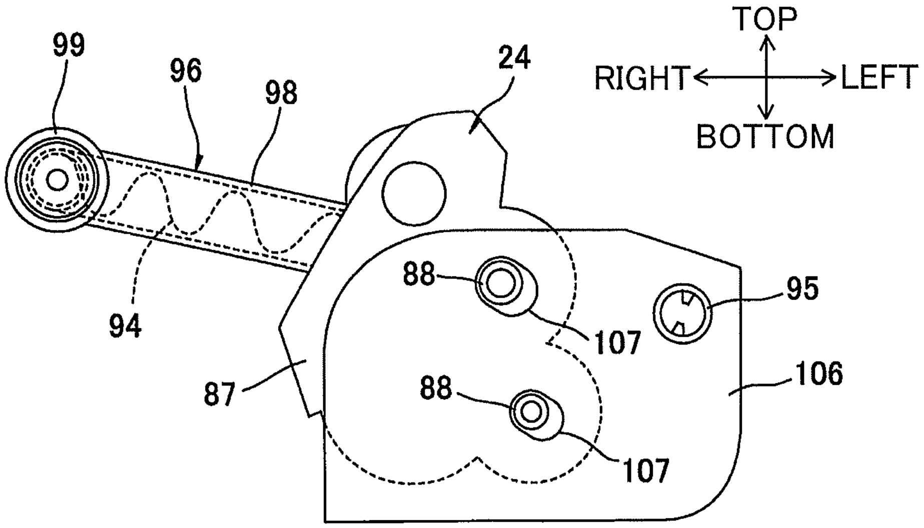
FIG. 8B is a rear side view of a non-black developing cartridge (the yellow, magenta, or cyan developing cartridge).

As shown in FIGS. 8A and 8B, the front wall 105 and rear wall 106 have a generally flat plate shape and are substantially rectangular in a rear side view.

Guide holes 107 are formed in each of the front wall 105 and rear wall 106. Two of the guide holes 107 are formed in each of the front wall 105 and rear wall 106 at positions separated vertically and corresponding to bosses 88 (described later) of the developing device 24. The guide holes 107 have a generally elliptical shape in a rear view and extend in a direction X (described later) in which the photosensitive drum 21 and developing roller 26 mutually oppose each other. The major axis of the guide holes 107 is approximately 1.5 times the outer diameter of the corresponding bosses 88, while the minor axis is substantially equivalent to the outer diameter of the corresponding bosses 88.

Figure 7C:
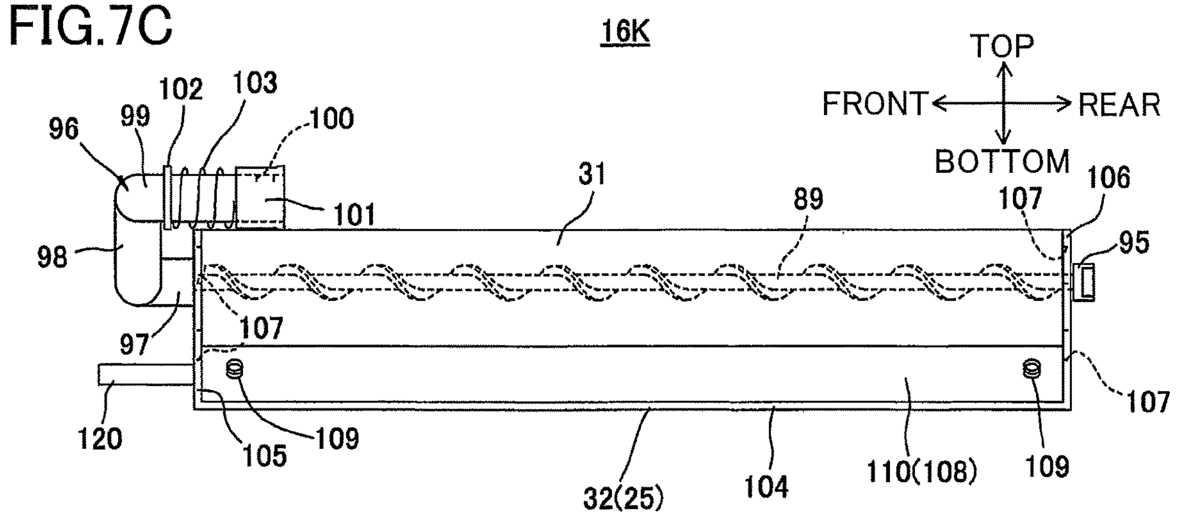
FIG. 7C is a right side view of a non-black developing cartridge (the yellow, magenta, or cyan developing cartridge) when the developing device has been removed.

As shown in FIGS. 7A, 7B, and 7C, a grip part 120 is formed on the front wall 105 of each first accommodating section 32 for mounting the developing cartridge 16 in and removing the developing cartridge 16 from the main casing 2. The grip part 120 has a generally rectangular shape in a side view and extends forward from the front surface of the front wall 105 near the bottom edge thereof.

As shown in FIG. 3, a spring support part 108 is provided on the bottom wall 104. The spring support part 108 is generally triangular in a front view and is elongated in the front-rear direction. The spring support part 108 is provided on the left end of the bottom wall 104. The top surface of the spring support part 108 opposing the outer surface of the toner-accommodating section 29 when the developing device 24 is accommodated in the first accommodating section 32 is formed as a curved surface 110. The curved surface 110 has a general arc shape in a front view, curving upward toward the left.

Coil springs 109 are provided on the spring support part 108. As shown in FIG. 7B, the coil springs 109 have an air-cored coil-shape. One each of the coil springs 109 is fixed to the front and rear ends of the curved surface 110 such that the axes of the coil springs 109 are substantially parallel to the direction X (described later) in which the photosensitive drum 21 and developing roller 26 mutually oppose each other (see FIG. 3).

As shown in FIG. 7A, the developing device 24 is accommodated in the first accommodating section 32. The developing device 24 has a hollow cylindrical shape and is elongated in the front-rear direction (see FIG. 1). The front end of the developing device 24 is closed by a front wall 86, and the rear end is closed by a rear wall 87. In this embodiment, the structures of the front wall 86 and rear wall 87 are identical. The following description will reference only the structure of the rear wall 87, but is applicable to the structure of the front wall 86 as well.

Bosses 88 are provided on the rear wall 87. As shown in FIGS. 7A and 8A, two of the bosses 88 are provided on the left portion of the rear wall 87 at positions separated vertically from each other. The bosses 88 are generally cylindrical in shape and protrude rearward from the rear wall 87. As shown in FIG. 8A, the top boss 88 has a larger diameter than the bottom top boss 88.

As shown in FIG. 7A, the developing device 24 is accommodated in the first accommodating section 32 by inserting the bosses 88 through the corresponding guide holes 107 from the inside outward. With this configuration, the developing device 24 is accommodated in the first accommodating section 32 so as to be capable of moving relative to the first accommodating section 32 along the direction X (described later) in which the photosensitive drum 21 and developing roller 26 mutually oppose each other, with the bosses 88 guided in the guide holes 107.

As shown in FIG. 3, the coil springs 109 are disposed between the spring support part 108 and the outer surface of the toner-accommodating section 29 in the developing device 24.

(1-2) Second Accommodating Section

The second accommodating section 31 is generally box-shaped. In a front view shown in FIG. 1, the second accommodating section 31 is generally rectangular, with a longer vertical dimension than left-right dimension. The second accommodating section 31 is coupled to the left end of the first accommodating section 32.

As shown in FIGS. 7B and 7C, a third auger screw 89 is disposed in the second accommodating section 31. The third auger screw 89 is elongated in the front-rear direction. The third auger screw 89 is disposed in the upper portion of the second accommodating section 31 (see FIG. 1), with its front end rotatably supported in the front wall of the second accommodating section 31 and its rear end rotatably supported in the rear wall of the second accommodating section 31. The rear end of the third auger screw 89 penetrates the rear wall of the second accommodating section 31 and protrudes rearward therefrom. A coupling 95 is retained on the protruding portion of the third auger screw 89 so as to be incapable of rotating relative thereto.

As shown in FIG. 7B, the third auger screw 89 provided in the black developing cartridge 16K is formed such that its front half spirals in the opposite direction as its rear half. On the other hand, the third auger screws 89 in the other developing cartridges 16 (yellow developing cartridge 16Y, magenta developing cartridge 16M, and cyan developing cartridge 16C) spiral in the same direction across their front-rear dimension, as shown in FIG. 7C. Further, the second accommodating section 31 in the black developing cartridge 16K (hereinafter referred to as the "second accommodating section 31K") includes an insertion hole 112, and a second receiving cylinder 90, as shown in FIG. 7B.

The insertion hole 112 is formed in the rear wall of the second accommodating section 31K and penetrates the upper end thereof in the front-rear direction. The diameter of the insertion hole 112 is substantially equivalent (slightly larger than) to the outer diameter of the first insertion part 78.

The second receiving cylinder 90 is generally cylindrical in shape and extends forward from the peripheral edge of the insertion hole 112. Hence, the second receiving cylinder 90 is disposed inside the second accommodating section 31K. The front end of the second receiving cylinder 90 is closed.

A first toner receiving hole 92 is formed in a bottom portion of the second receiving cylinder 90. The first toner receiving hole 92 vertically penetrates the rear end on the bottom portion of the second receiving cylinder 90, providing communication between the second accommodating section 31K and the cartridge-side receiving cylinder 90.

The second receiving cylinder 90 also includes a cartridge-side shutter 91. The cartridge-side shutter 91 is generally cylindrical in shape and is accommodated inside the second receiving cylinder 90. The cartridge-side shutter 91 is elongated in the front-rear direction and closed on the rear end. The outer diameter of the cartridge-side shutter 91 is substantially equivalent to the inner diameter of the second receiving cylinder 90. The cartridge-side shutter 91 is slidably disposed in the second receiving cylinder 90 between an open position (see FIG. 2) on the front end of the second receiving cylinder 90 for opening the first toner receiving hole 92, and a closed position (see FIG. 7B) on the rear end of the second receiving cylinder 90 for closing the first toner receiving hole 92.

A compression spring 93 is interposed between the front wall of the second receiving cylinder 90 and the rear wall of the cartridge-side shutter 91. The compression spring 93 constantly urges the cartridge-side shutter 91 rearward toward the closed position.

A second conveying pipe 96 is coupled to the second accommodating section 31. As shown in FIG. 7, the second conveying pipe 96 has a pipe-like structure. A coil-spring-like screw 94 is accommodated inside the second conveying pipe 96 (see FIG. 1). As shown in FIG. 7B, the second conveying pipe 96 has an angular U-shape in a plan view, with both front and rear ends bent rearward. Specifically, the second conveying pipe 96 is integrally formed of a second coupling part 97, a middle part 98, and the second insertion part 99 as an engaging portion.

The second coupling part 97 constitutes the left end portion of the second conveying pipe 96. The second coupling part 97 extends in the front-rear direction, with its rear end fixed to the front wall of the second accommodating section 31 so that the second coupling part 97 shares a central axis with the third auger screw 89 and communicates with the interior of the second accommodating section 31. With this configuration, the second conveying pipe 96 moves together with the corresponding developing cartridge 16.

The middle part 98 bends rightward from the front end of the second coupling part 97 and extends along an upward slope toward the right (see FIG. 1).

The second insertion part 99 bends rearward from the right end of the middle part 98 and extends rearward therefrom.

A second toner receiving hole 100 is formed in the second insertion part 99. The second toner receiving hole 100 is formed toward the rear end of the second insertion part 99, penetrating the upper portion of the second insertion part 99 vertically.

The second insertion part 99 includes a flange part 102, and the pipe-side shutter 101. The flange part 102 is provided around the outer peripheral surface of the second insertion part 99 on the front portion thereof. The flange part 102 has an annular plate shape that expands radially outward from the second insertion part 99.

The pipe-side shutter 101 is generally cylindrical in shape and elongated in the front-rear direction. The pipe-side shutter 101 is fitted around the outside of the second insertion part 99. The inner diameter of the pipe-side shutter 101 is substantially equivalent (slightly larger than) to the outer diameter of the second insertion part 99. The pipe-side shutter 101 is slidably provided on the second insertion part 99 between an open position (see FIG. 5B) on the front end of the second insertion part 99 for exposing the drum-waste-toner receiving hole 100, and a closed position (see FIG. 7B) on the rear end of the second insertion part 99 for closing the second toner receiving hole 100. In other words, the pipe-side shutter 101 functions to open and close the second toner receiving hole 100.

A compression spring 103 is interposed between the front end of the pipe-side shutter 101 and the front surface of the flange part 102. The compression spring 103 constantly urges the pipe-side shutter 101 rearward toward the closed position.

6. Mounting and Removal Operations of the Developing Cartridges

Next, operations for mounting the developing cartridges 16 in and removing the developing cartridges 16 from the main casing 2 will be described.

To mount one of the developing cartridges 16 in the main casing 2, first the front cover 6 is placed in the open position, as shown in FIG. 6. The operator grips the grip part 120 of the developing cartridge 16 and inserts the developing cartridge 16 into the cartridge-accommodating space 115 from the front side thereof.

As the developing cartridge 16 is inserted, the bottom edge of the cartridge frame 25 is inserted onto the retaining member 20 from the front side thereof. In other words, the retaining member 20 is positioned to support the bottom of the cartridge frame 25 and functions to guide the developing cartridge 16 as the developing cartridge 16 moves in the front and rear directions. At this time, the developing device 24 passes through corresponding cartridge grooves 52.

Figure 5B:
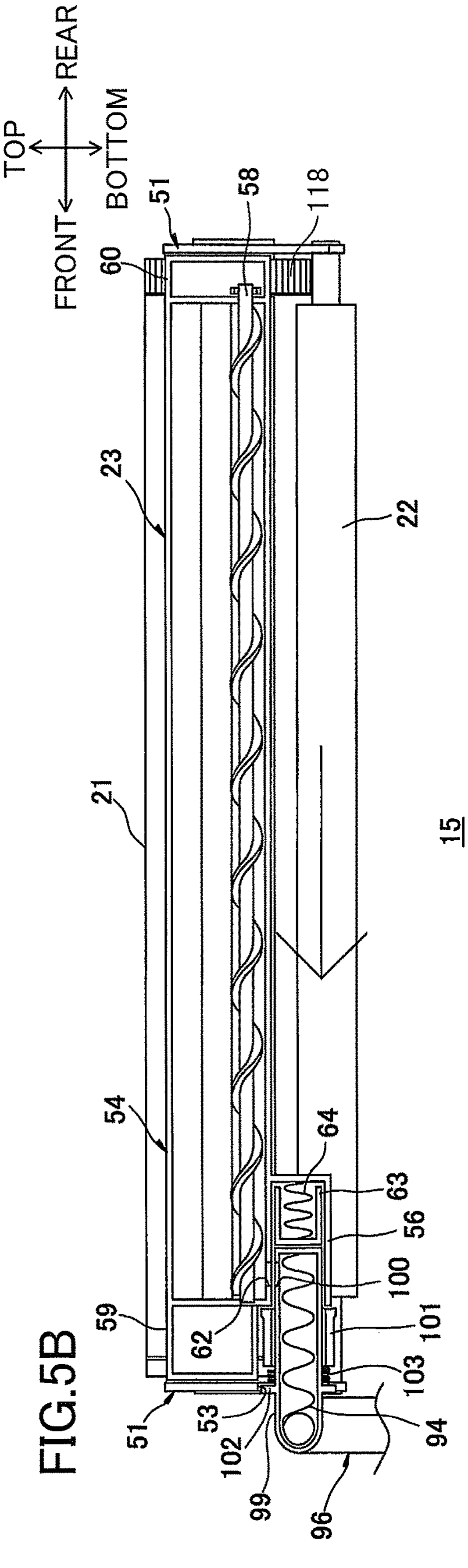
FIG. 5B is a cross-sectional view of the drum unit taken along the plane B-B in FIG. 4(*a*) when the drum-unit-side shutter is disposed in an open position.

As the developing cartridge 16 moves farther rearward relative to the main casing 2, the pipe-side shutter 101 passes through the front side of the insertion hole 53, as shown in FIG. 5B. At this time, the upper portion on the rear end of the pipe-side shutter 101 contacts the lower portion on the front end of the drum collection unit 54, and the rear end of the second insertion part 99 contacts the front end of the drum-unit-side shutter 63.

As the developing cartridge 16 moves farther rearward, the pipe-side shutter 101 is pushed relatively forward against the urging force of the compression spring 103 by the drum collection unit 54 and is placed in the open position. At this time, the second insertion part 99 is inserted into the first receiving cylinder 56 until the positions of the first toner outlet 62 and second toner receiving hole 100 are vertically aligned. Thus, the second insertion part 99 is fitted into (engaged with) the first receiving cylinder 56.

Consequently, the pipe-side shutter 101 and drum-unit-side shutter 63 are disposed in their respective open positions, and the first toner outlet 62 and second toner receiving hole 100 are vertically aligned and in communication with each other. As a result, the left end of the second conveying pipe 96 (rear end of the second coupling part 97) is connected to the front end of the second accommodating section 31, while the right end of the second conveying pipe 96 (rear end of the second insertion part 99) is connected to the front end of the drum collection unit 54, as shown in FIG. 1.

When the black developing cartridge 16K is inserted into the front side of the cartridge-accommodating space 115, as shown in FIG. 2, the portion of the rear wall 106 defining the peripheral edge of the insertion hole 112 (see FIG. 7B) contacts the front end of the conveying-pipe-side shutter 83 from the front side, and the rear end of the cartridge-side shutter 91 contacts the front end of the first insertion part 78 (see FIGS. 6 and 7B).

As the black developing cartridge 16K moves farther rearward, the peripheral edge of the insertion hole 112 presses the conveying-pipe-side shutter 83 rearward against the urging force of the compression spring 84 and places the conveying-pipe-side shutter 83 in the open position. At this time, the first insertion part 78 is inserted into the second receiving cylinder 90 until the second toner outlet 79 and first toner receiving hole 92 are aligned vertically. As a result, the conveying-pipe-side shutter 83 and cartridge-side shutter 91 are disposed in their respective open positions, and the second toner outlet 79 and first toner receiving hole 92 are vertically aligned and in communication with each other. That is, the left end of the first conveying pipe 70 (front end of the first insertion part 78) is connected to the rear end of the second accommodating section 31, and the right end of the first conveying pipe 70 (rear end of the first coupling part 76) is connected to the rear end of the belt collection unit 68 (see FIG. 2), as shown in FIG. 1.

The above procedure completes the operation for mounting a developing cartridge 16 in the main casing 2 (the cartridge-accommodating space 115). At this time, the developing roller 26 of the developing cartridge 16 contacts the lower left side of the photosensitive drum 21 in the drum unit 15, as illustrated in FIG. 3. Specifically, the developing roller 26 and photosensitive drum 21 oppose and contact each other in the direction X.

Further, the spring support part 108 of the first accommodating section 32 is disposed on the left end of the bottom wall 104 constituting the cartridge frame 25 and, hence, is on the opposite side of the developing roller 26 from the photosensitive drum 21. Further, the coil springs 109 are disposed between the curved surface 110 of the spring support part 108 and the toner-accommodating section 29, with their axes substantially parallel to the direction X. The coil springs 109 urge the developing device 24 in a direction Y, thereby urging the developing roller 26 toward the photosensitive drum 21.

The retaining member 20 accommodates the lower portion of the cartridge frame 25. The retaining member 20 is disposed on the opposite side of the cartridge frame 25 (the spring support part 108) from the coil springs 109. Thus, the retaining member 20 fixes the cartridge frame 25 with respect to the inner casing 81.

To remove a developing cartridge 16 from the main casing 2 (cartridge-accommodating space 115), the procedure for mounting the developing cartridge 16 described above is performed in reverse. By performing this operation, the developing cartridge 16 is pulled forward out of the cartridge-accommodating space 115 while being guided on the retaining member 20, as shown in FIG. 6. Hence, the direction in which the developing cartridge 16 is mounted into and removed from the main casing 2 (front-rear direction) is identical to the axial direction of the photosensitive drums 21, and the retaining member 20 functions to guide the developing cartridge 16 being mounted in and removed from the main casing 2.

When the developing cartridge 16 is removed from the main casing 2, the second insertion part 99 of the second conveying pipe 96 is disconnected from the drum collection unit 54 (see FIG. 5(*b*), i.e. the second insertion part 99 is disengaged from first receiving cylinder 56), and the first insertion part 78 of the first conveying pipe 70 is disconnected from the second accommodating section 31K of the black developing cartridge 16K (see FIG. 7B). In other words, the second insertion part 99 is capable of being disconnected from the drum collection unit 54, and the first insertion part 78 is capable of being disconnected from the second accommodating section 31K.

Next, the compression spring 103 places the pipe-side shutter 101 in the closed position (see FIG. 7A), and the compression spring 84 places the conveying-pipe-side shutter 83 in the closed position (see FIG. 6). Hence, as shown in FIG. 7A, the pipe-side shutter 101 closes the second toner receiving hole 100 when the second insertion part 99 is disconnected from the drum collection unit 54 (see FIG. 5B). Further, as shown in FIG. 6, the conveying-pipe-side shutter 83 closes the second toner outlet 79 when the first insertion part 78 is disconnected from the second accommodating section 31K (see FIG. 7B).

The above procedure completes the operation for removing the developing cartridge 16 from the main casing 2 (cartridge-accommodating space 115). As described above, the developing cartridges 16 are mounted in and removed from the main casing 2 while the photosensitive drums 21 are accommodated in the main casing 2.

7. Waste Toner Recovery and Collection Operation (Cleaning Operation)

At the beginning of an image-forming operation performed on the color printer 1, a motor (not shown) provided in the main casing 2 generates a drive force to rotate the first auger screws 58, second auger screw 71, and third auger screws 89, as well as the screws 94 in the second conveying pipes 96 and the screw 82 in the first conveying pipe 70.

As described above, a primary transfer is performed during an image-forming operation on the color printer 1 for sequentially transferring toner images carried on the surfaces of the photosensitive drums 21 onto the lower portion of the intermediate transfer belt 38 as the lower portion moves from left to right. After the toner images are transferred to the intermediate transfer belt 38, residual toner (waste toner) not transferred onto the intermediate transfer belt 38 remains on the surfaces of the photosensitive drums 21. As the photosensitive drums 21 rotate, the corresponding drum scraping blades 55 scrape the waste toner off the photosensitive drums 21. The toner removed from the photosensitive drums 21 falls through the openings 57 into corresponding drum collection units 54. Hence, the waste toner is removed from the surfaces of the photosensitive drums 21 by the drum scraping blades 55 and collected in the drum collection units 54.

As illustrated in FIG. 5A, waste toner that falls into the drum collection unit 54 (waste toner recovered by the drum scraping blade 55) is collected in the drum collection unit 54 and subsequently conveyed forward in the drum collection unit 54 by the rotating first auger screw 58. Upon arriving at the front end of the drum collection unit 54, the waste toner falls by its own weight through the first toner outlet 62 and the second toner receiving hole 100 into the second insertion part 99.

As shown in FIG. 7B, the rotating screw 94 conveys waste toner that falls into the second insertion part 99 through the middle part 98 to the second coupling part 97. Waste toner conveyed to the second coupling part 97 is subsequently conveyed through the second accommodating section 31 by the rotating third auger screw 89. Hence, the second conveying pipe 96 serves to convey waste toner from the drum collection unit 54 to the second accommodating section 31.

Waste toner conveyed into the second accommodating section 31K of the black developing cartridge 16K is subsequently conveyed rearward by the rotating third auger screw 89 and collected in the front-rear center region of the second accommodating section 31K. Waste toner conveyed into the second accommodating section 31 of the other developing cartridges 16 (yellow developing cartridge 16Y, magenta developing cartridge 16M, and cyan developing cartridge 16C), on the other hand, is conveyed rearward by the rotating third auger screw 89 and collected at the rear end of the second accommodating section 31.

As described earlier, a secondary transfer is subsequently performed to transfer the color image formed on the intermediate transfer belt 38 to a sheet of paper P supplied by the sheet-feeding unit 4 as the intermediate transfer belt 38 passes through a position opposing the secondary transfer roller 35. After completing the secondary transfer to transfer the color image onto the sheet of paper P, residual toner (waste toner) remains on the intermediate transfer belt 38. As the intermediate transfer belt 38 continues to circulate and the waste toner carried on the intermediate transfer belt 38 arrives at a position confronting the belt cleaning roller 72, the waste toner is recovered on the circumferential surface of the belt cleaning roller 72, thereby removing the waste toner from the intermediate transfer belt 38.

As the belt cleaning roller 72 continues to rotate, bringing the waste toner carried on the circumferential surface of the belt cleaning roller 72 to a position confronting the relay roller 74, the waste toner is attracted from the belt cleaning roller 72 to the circumferential surface of the relay roller 74.

As the relay roller 74 continues to rotate, the waste toner on the circumferential surface of the relay roller 74 is scraped off by the scraping blade 75 and falls into the belt collection unit 68. As illustrated in FIG. 6, waste toner that falls into the belt collection unit 68 is accumulated in the belt collection unit 68 and subsequently conveyed rearward in the belt collection unit 68 by the rotating second auger screw 71. The second auger screw 71 conveys the waste toner through the belt collection unit 68 to the first conveying pipe 70.

Waste toner supplied into the first conveying pipe 70 is conveyed from the first coupling part 76 through the middle part 77 to the first insertion part 78 by the rotating screw 82. Waste toner conveyed into the first insertion part 78 falls by its own weight through the second toner outlet 79 and the first toner receiving hole 92 into the second accommodating section 31K (the second accommodating section 31 of the black developing cartridge 16K). As shown in FIG. 7B, the waste toner that falls into the second accommodating section 31K is subsequently conveyed in a forward direction by the rotating third auger screw 89 and is collected in the front-rear center region of the second accommodating section 31K. Hence, the first conveying pipe 70 functions to convey waste toner from the belt collection unit 68 into the second accommodating section 31.

This completes the cleaning operation of the color printer 1.

8. Operational Advantages

As shown in FIG. 6, the developing cartridges 16 of the color printer 1 are detachably mountable in the cartridge-accommodating spaces 115 of the main casing 2 while the photosensitive drums 21 are accommodated in the main casing 2. This configuration allows the developing cartridges 16, which have a shorter lifespan than the photosensitive drums 21, to be replaced independently of the photosensitive drums 21.

As shown in FIG. 3, the spring support part 108 of the cartridge frame 25 is disposed on the opposite side of the developing roller 26 from the photosensitive drum 21 when the developing cartridge 16 is mounted in the cartridge-accommodating space 115 of the main casing 2. Further, the developing device 24, which includes the developing roller 26, is accommodated in the cartridge frame 25, which includes the second accommodating section 31, and is capable of moving relative to the cartridge frame 25.

The coil springs 109 are provided on front and rear ends of the curved surface 110 formed on the spring support part 108. The coil springs 109 are disposed between the curved surface 110 and the outer surface of the toner-accommodating section 29 constituting the developing device 24, with their axes parallel to the direction X. Therefore, the coil springs 109 urge the developing device 24 (developing roller 26) toward the photosensitive drum 21 in the direction Y, which is substantially parallel to the direction X in which the photosensitive drum 21 and developing roller 26 mutually oppose each other.

Thus, since the urging force of the coil springs 109 is applied along the direction X in which the photosensitive drum 21 and developing roller 26 mutually oppose each other, the coil springs 109 can press the developing roller 26 reliably toward the photosensitive drum 21. Hence, this configuration can improve the precision in positioning the developing roller 26 and photosensitive drum 21 relative to each other.

Therefore, this embodiment can improve the accuracy in positioning the developing roller 26 and photosensitive drum 21 relative to each other, while accommodating the second accommodating section 31 compactly.

As shown in FIG. 1, the drum unit 15 also includes the drum cleaners 23. As shown in FIG. 4, each of the drum cleaners 23 has the drum scraping blade 55 and the drum collection unit 54. After a primary transfer is performed during an image-forming operation on the color printer 1, the drum scraping blade 55 removes waste toner remaining on the surface of the corresponding photosensitive drum 21, and the waste toner is temporarily collected in the drum collection unit 54.

Since the second conveying pipe 96 is connected to the first receiving cylinder 56 of the drum collection unit 54, as shown in FIG. 5B, waste toner collected in the drum collection unit 54 can be conveyed from the drum collection unit 54 to the second accommodating section 31 via the second conveying pipe 96 and can be collected in the second accommodating section 31. Thus, this configuration can recover and collect waste toner from the surface of the photosensitive drum 21, while improving the precision for positioning the developing roller 26 and photosensitive drum 21 relative to each other.

As shown in FIG. 1, the left end of the second conveying pipe 96 (rear end of the second coupling part 97) is connected to the front end of the second accommodating section 31, while the right end of the second conveying pipe 96 (rear end of the second insertion part 99) is connected to the front end of the drum collection unit 54. This configuration allows for an efficient layout of the second conveying pipe 96 while enabling the second conveying pipe 96 to convey waste toner collected by the drum scraping blade 55 from the front of the main casing 2 to the second accommodating section 31.

Further, since the second conveying pipe 96 is fixed to the front surface on the front wall 105 of the first accommodating section 32, the developing cartridge 16 can be smoothly mounted in and removed from the main casing 2 while the drum unit 15 is accommodated in the main casing 2.

As shown in FIG. 7A, the second conveying pipe 96 has the second insertion part 99, and the second insertion part 99 includes the second toner receiving hole 100 and pipe-side shutter 101. As shown in FIG. 5B, the second insertion part 99 is connected to the drum collection unit 54 when the developing cartridge 16 is mounted in the main casing 2. As shown in FIG. 6, the second insertion part 99 is disconnected from the drum collection unit 54 (see FIG. 5B) when the developing cartridge 16 is removed from the main casing 2.

Accordingly, the drum cleaner 23 disposed adjacent to the photosensitive drum 21 can be separated from the second accommodating section 31 provided in the cartridge frame 25. This configuration enables the developing cartridge 16 to be replaced independently of the drum cleaner 23.

As shown in FIG. 7A, the pipe-side shutter 101 closes the second toner receiving hole 100 when the second insertion part 99 is disconnected from the drum collection unit 54 (see FIG. 5B. This configuration prevents waste toner from leaking out through the second toner receiving hole 100.

As shown in FIG. 1, the belt unit 34 includes the intermediate transfer belt 38 and the belt cleaner 40. The belt cleaner 40 further includes the belt recovery unit 65, which has the belt cleaning roller 72 and relay roller 74, and the belt collection unit 68, which is provided with the scraping blade 75. After a secondary transfer is performed during an image-forming operation, the belt cleaning roller 72 can remove residual waste toner from the intermediate transfer belt 38. The waste toner removed by the belt cleaning roller 72 is transferred from the belt cleaning roller 72 to the relay roller 74 and temporarily collected in the belt collection unit 68.

Since the first conveying pipe 70 is connected to the belt collection unit 68, as shown in FIG. 6, waste toner collected in the belt collection unit 68 is conveyed from the belt collection unit 68 to the second accommodating section 31 via the first conveying pipe 70 and can be stored in the second accommodating section 31. Thus, this configuration can recover waste toner from the surface of the intermediate transfer belt 38 and store the waste toner while improving the precision in which the developing roller 26 and photosensitive drum 21 are positioned relative to each other.

The first conveying pipe 70 also includes the first insertion part 78, which has the second toner outlet 79 and conveying-pipe-side shutter 83. The first insertion part 78 is connected to the second accommodating section 31K of the black developing cartridge 16K (see FIG. 7B) while the developing cartridges 16 are mounted in the main casing 2. The first insertion part 78 is disconnected from the second accommodating section 31K when the developing cartridge 16 is removed from the main casing 2. Therefore, the belt cleaner 40 disposed adjacent to the intermediate transfer belt 38 can be separated from the second accommodating section 31 provided in the cartridge frame 25, enabling the black developing cartridge 16K to be replaced independently of the belt cleaner 40.

Further, the conveying-pipe-side shutter 83 closes the second toner outlet 79 when the first insertion part 78 is disconnected from the second accommodating section 31K (see FIG. 7B). This configuration can prevent waste toner from leaking out through the second toner outlet 79.

As shown in FIG. 1, the left end of the first conveying pipe 70 (the front end of the first insertion part 78) is connected to the rear end of the second accommodating section 31K in the black developing cartridge 16K, while the right end of the first conveying pipe 70 (the rear end of the first coupling part 76) is connected to the rear end of the belt collection unit 68 (see FIG. 2). Therefore, the second conveying pipe 96 is disposed in front of the second accommodating section 31K, while the first conveying pipe 70 is disposed to the rear of the second accommodating section 31K. Hence, waste toner collected by the drum cleaner 23 can be conveyed into the second accommodating section 31K from the front side, while waste toner collected by the belt cleaner 40 can be conveyed into the second accommodating section 31K from the rear side.

This configuration achieves an efficient arrangement of the second conveying pipe 96 and first conveying pipe 70 that enable waste toner collected from the surface of the photosensitive drum 21 and waste toner collected from the intermediate transfer belt 38 to be both accumulated in the second accommodating section 31K. Hence, the second accommodating section 31K can be compactly accommodated while achieving an efficient arrangement of the second conveying pipe 96 and first conveying pipe 70.

Further, since the first conveying pipe 70 is fixed to the rear side wall 66 corresponding to the belt collection unit 68, the developing cartridge 16 can be smoothly mounted in and removed from the main casing 2.

As shown in FIG. 6, the cartridge frame 25 is also provided with the grip part 120. Accordingly, an operator can grip the grip part 120 when mounting the developing cartridge 16 in and removing the developing cartridge 16 from the main casing 2, facilitating mounting and removing operations. Particularly, since the grip part 120 is provided on the cartridge frame 25, which is fixed to the main casing 2, rather than the developing device 24, which can move relative to the main casing 2, the operator can smoothly mount and remove the developing cartridge 16 relative to the main casing 2 by gripping the grip part 120. This configuration can prevent the photosensitive drums 21 from contacting other members, such as the developing cartridges 16, when mounting and removing the developing cartridge 16 relative to the main casing 2, thereby preventing damage to the photosensitive drums 21 caused by such contact.

As shown in FIG. 2, the retaining members 20 are provided on the partitioning wall 111 of the inner casing 81. The lower portions of the cartridge frames 25 in the developing cartridges 16 are accommodated in the respective retaining members 20 when the developing cartridges 16 are mounted in the cartridge-accommodating spaces 115. Accordingly, the cartridge frames 25 are fixed relative to the inner casing 81. This configuration can maintain the relative positions of the coil springs 109 provided on the spring support part 108 of each cartridge frame 25 and the corresponding photosensitive drum 21 with accuracy. Therefore, the coil springs 109 can reliably urge the developing roller 26 toward the corresponding photosensitive drum 21, further improving the precision in positioning the developing roller 26 and photosensitive drum 21 relative to each other.

The retaining member 20 is also provided on the opposite side of the spring support part 108 from the coil springs 109. With this construction, the partitioning wall 111 of the inner casing 81 can absorb the reaction force of the coil springs 109 on the cartridge frame 25 via the retaining member 20. This configuration can reliably apply the urging force of the coil springs 109 to the developing roller 26, as illustrated in FIG. 3, while the cartridge frame 25 is reliably fixed to the partitioning wall 111. Hence, the coil springs 109 can reliably urge the developing roller 26 toward the photosensitive drum 21, thereby further improving the precision in which the developing roller 26 and photosensitive drum 21 are positioned relative to each other.

The retaining member 20 is provided for supporting the bottom of the corresponding cartridge frame 25. Since the urging force of the coil springs 109 is reliably applied to the developing roller 26, the developing roller 26 can be reliably urged toward the photosensitive drum 21.

The retaining member 20 also guides the developing cartridge 16 as the developing cartridge 16 is mounted in and removed from the main casing 2. By ensuring the smooth mounting and removal operations of the developing cartridge 16, this configuration can prevent the developing roller 26 and developing device 24 from contacting the photosensitive drum 21, preventing damage to the photosensitive drum 21.

As shown in FIG. 1, four developing cartridges 16 are disposed beneath the belt unit 34 and photosensitive drums 21. Accordingly, the drum cleaners 23 and the belt cleaner 40 are positioned higher than the second accommodating sections 31. With this construction, the weight of the waste toner itself can be used to convey the waste toner toward the second accommodating sections 31 via the first conveying pipe 70 and second conveying pipes 96. As a result, waste toner can be conveyed reliably to the second accommodating sections 31.

As shown in FIG. 6, the developing cartridges 16 of the color printer 1 can be moved between a mounted position, mounted in the cartridge-accommodating spaces 115 of the main casing 2, and a separated position, removed from the cartridge-accommodating spaces 115 of the main casing 2, while the drum unit 15 is accommodated in the main casing 2. This configuration enables the developing cartridges 16, which have a shorter lifespan than the drum unit 15 (the photosensitive drums 21) to be replaced independently of the drum unit 15.

The second accommodating sections 31 provided in the developing cartridges 16 having this construction can be made more compact than if the second accommodating sections 31 were provided in the drum unit 15. As a result, the color printer 1 can also be made more compact.

Further, the drum cleaners 23 do not move relative to the photosensitive drums 21, even when the developing cartridges 16 move from the mounted position to the separated position. This arrangement reduces the likelihood of toner dropping from the photosensitive drums 21 and drum cleaners 23, minimizing the amount of toner that contaminates the inside and outside of the main casing 2. Thus, the color printer 1 can be configured in a compact shape, while minimizing the amount of toner that soils the inside and outside of the main casing 2.

As shown in FIG. 2, the right end of the second conveying pipe 96 is configured as the second insertion part 99, which extends in the front-rear direction. As shown in FIG. 5B, the first receiving cylinder 56 is provided on the front end of the drum collection unit 54 (the downstream end with respect to the direction in which the developing cartridge 16 is pulled).

The second insertion part 99 is fitted into (engaged with) the first receiving cylinder 56 when the developing cartridge 16 is in the mounted position and is not fitted into (is disengaged from) the first receiving cylinder 56 when the developing cartridge 16 is in the separated position shown in FIG. 6. Therefore, the second conveying pipe 96 can be reliably connected to the drum cleaner 23 when the developing cartridge 16 is in the mounted position, as illustrated in FIG. 5B, and can be reliably disconnected from the drum cleaner 23 when the developing cartridge 16 is in the separated position, as illustrated in FIG. 6.

As shown in FIGS. 7B and 7C, the second insertion part 99 also has the second toner receiving hole 100 and the pipe-side shutter 101. The pipe-side shutter 101 can close the second toner receiving hole 100 when the second insertion part 99 is not fitted into (is disengaged from) the first receiving cylinder 56, preventing waste toner from leaking out through the second toner receiving hole 100. Hence, this construction minimizes the amount of waste toner that contaminates the inside and outside of the main casing 2.

As shown in FIG. 1, the color printer 1 also includes the intermediate transfer belt 38, the belt cleaner 40, and the first conveying pipe 70. The left end of the first conveying pipe 70 is connected to the rear wall 106 of the second accommodating section 31K (the upstream end in the direction that the developing cartridge 16 is pulled), while the right end is connected to the rear side wall 66 of the belt cleaner 40 (the upstream end in the direction that the developing cartridge 16 is pulled). Thus, after the belt cleaner 40 removes and recovers waste toner from the intermediate transfer belt 38, the waste toner can be conveyed through the first conveying pipe 70 and collected in the second accommodating section 31.

In other words, both waste toner collected from the surfaces of the photosensitive drums 21 and waste toner collected from the intermediate transfer belt 38 can be accommodated in a common second accommodating section 31. This construction requires fewer parts than if a separate second accommodating section 31 were provided for storing waste toner collected from the intermediate transfer belt 38 and is thereby conducive to constructing a more compact color printer 1.

As shown in FIG. 2, the second conveying pipe 96 is disposed on the front side (the downstream side in the direction that the developing cartridge 16 is pulled) of the second accommodating section 31 and drum cleaner 23, and the first conveying pipe 70 is disposed on the rear side (the upstream side in the direction that the developing cartridge 16 is pulled) of the second accommodating section 31 and drum cleaner 23. Therefore, the above embodiment can ensure an efficient arrangement of the second conveying pipes 96 and first conveying pipe 70.

While not shown in the drawings, a gear train or other drive mechanism may be disposed in the main casing 2 on the rear side of the drum unit 15 and developing cartridge 16 for transmitting a drive force to the drum gears 118 of the photosensitive drums 21 (see FIG. 5A) and the like. This configuration can prevent the second conveying pipe 96 from interfering with the arrangement of the gear train or other drive mechanism since the second conveying pipe 96 is disposed on the front side of the drum unit 15 and developing cartridge 16.

On the other hand, the first conveying pipe 70 is disposed on the rear side of the drum unit 15 and developing cartridge 16. However, since the middle part 77 of the first conveying pipe 70 when projected in the front-rear direction bends so as to avoid the projected surface of the leftmost photosensitive drum 21, the first conveying pipe 70 does not significantly interfere with the arrangement of the gear train or other drive mechanism. Accordingly, this configuration utilizes space in the main casing 2 effectively.

Therefore, the above embodiment reduces the number of required parts, enabling the color printer 1 to be made more compact, and ensures an efficient arrangement of the second conveying pipes 96 and the first conveying pipe 70.

As shown in FIG. 1, four of the photosensitive drums 21 are provided for the colors black, yellow, magenta, and cyan. The photosensitive drums 21 are arranged parallel to one another and are spaced at intervals in the left-right direction. The developing device 24 of each photosensitive drum 21 has the toner-accommodating section 29 for accommodating toner in the corresponding color (black, yellow, magenta, or cyan). By supplying toner from the four developing cartridges 16 to the corresponding photosensitive drums 21 in the respective colors yellow, magenta, cyan, and black, the color printer 1 can form full-color images.

What is claimed is:

1. An image forming apparatus comprising:
a main casing including a retaining member;
a photosensitive drum provided in the main casing, the photosensitive drum being configured to carry a developer image and rotatable about an axis extending in an axial direction; and
a developing cartridge attachable to and detachable from the main casing, the developing cartridge comprising:
 a frame;
 a developing device including:
  a developing roller; and
  a developer-accommodating section configured to accommodate therein developer to be supplied to the photosensitive drum via the developing roller,
wherein the retaining member fixes the frame with respect to the main casing when the frame is attached to the main casing, and
wherein the frame is configured to movably support the developing device so that the developing roller contacts the photosensitive drum.

2. The image forming apparatus according to claim 1, wherein the retaining member extends in the axial direction.

3. The image forming apparatus according to claim 1, wherein the developing cartridge further comprises:
 a grip part.

4. The image forming apparatus according to claim 1, wherein the developing cartridge further comprises:
 an urging member configured to urge the developer-accommodating section toward the photosensitive drum.

5. The image forming apparatus according to claim 1, wherein the developing cartridge further comprises:
 a waste-developer-accommodating section.

6. The image forming apparatus according to claim 1, wherein the developing cartridge is attachable to and detachable from the main casing in the axial direction.

7. The image forming apparatus according to claim 1, wherein the retaining member is a guide configured to guide the developing cartridge being attached to and detached from the main casing.

* * * * *